US012688538B2

(12) United States Patent
Farrar et al.

(10) Patent No.: US 12,688,538 B2
(45) Date of Patent: *Jul. 21, 2026

(54) TRAVELER TRACKING SYSTEM

(71) Applicant: Nomadix, Inc., Woodland Hills, CA (US)

(72) Inventors: Christopher Farrar, Columbus, OH (US); Charles Reed, Singapore (SG); Nicolas Mercier, Singapore (SG); Kenneth Reed, Mission Viejo, CA (US)

(73) Assignee: Nomadix, Inc., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/612,176

(22) Filed: Mar. 21, 2024

(65) Prior Publication Data

US 2024/0412304 A1      Dec. 12, 2024

Related U.S. Application Data

(63) Continuation of application No. 17/813,911, filed on Jul. 20, 2022, now Pat. No. 11,966,991, which is a
(Continued)

(51) Int. Cl.
*G06Q 30/00* (2023.01)
*G06Q 30/0251* (2023.01)
(Continued)

(52) U.S. Cl.
CPC ......... *G06Q 50/12* (2013.01); *G06Q 30/0255* (2013.01); *H04L 47/781* (2013.01); *H04L 47/808* (2013.01)

(58) Field of Classification Search
CPC .. G06Q 50/12; G06Q 30/0255; H04L 47/781; H04L 47/808
See application file for complete search history.

(56) References Cited

U.S. PATENT DOCUMENTS 5,237,499 A * 8/1993 Garback ................ G07B 15/00
                                                                    705/5
8,254,395 B2     8/2012 Kim et al.
(Continued)

FOREIGN PATENT DOCUMENTS

CA      2775782 A1     7/2012
WO      0149003 A2     7/2001

OTHER PUBLICATIONS

"A survey of privacy vulnerabilities and defenses in geosocial networks. IEEE". 2013. (Year: 2013).*
(Continued)

*Primary Examiner* — Maria V Vanderhorst
(74) *Attorney, Agent, or Firm* — Morrison & Foerster LLP

(57)          ABSTRACT

Systems and methods described herein may include a memory and a computing a system in communication with said memory. The computing system may be configured to receive data from network management systems. In one embodiment, the network management system includes a network gateway. Users at venues may access external network resources using the network management system. Further, the network management systems may extract device identifiers from network packets sent from user devices to request access to external network resources. In some embodiments, the network management system may provide transmission control protocol handshake completion data to user devices. In some embodiments, the computing system also receives one or more attributes associated with the venue, user data associated with the user device, and connection data associated with communication between the user device and said external network resource.

20 Claims, 15 Drawing Sheets

Related U.S. Application Data continuation of application No. 16/193,335, filed on Nov. 16, 2018, now Pat. No. 11,416,954, which is a continuation of application No. 14/538,580, filed on Nov. 11, 2014, now Pat. No. 10,134,098.

(60) Provisional application No. 62/016,327, filed on Jun. 24, 2014, provisional application No. 61/902,744, filed on Nov. 11, 2013.

(51) Int. Cl.

| | |
|---|---|
| *G06Q 50/12* | (2012.01) |
| *H04L 47/78* | (2022.01) |
| *H04L 47/80* | (2022.01) |
| *G05B 19/418* | (2006.01) |

(56) References Cited

U.S. PATENT DOCUMENTS

| | | | |
|---|---|---|---|
| 8,364,806 | B2 | 1/2013 | Short et al. |
| 9,003,488 | B2 | 4/2015 | Spencer |
| 10,134,098 | B2 | 11/2018 | Farrar et al. |
| 11,416,954 | B2 | 8/2022 | Farrar et al. |
| 11,966,991 | B2 | 4/2024 | Farrar |
| 2007/0179367 | A1 | 8/2007 | Ruchti et al. |
| 2007/0186106 | A1 | 8/2007 | Ting et al. |
| 2008/0072285 | A1 | 3/2008 | Sankaran et al. |
| 2008/0248815 | A1 | 10/2008 | Busch |
| 2011/0093340 | A1 | 4/2011 | Kramer et al. |
| 2012/0163206 | A1 | 6/2012 | Leung et al. |
| 2012/0190386 | A1 | 7/2012 | Anderson |
| 2013/0055358 | A1 | 2/2013 | Short et al. |
| 2013/0109412 | A1 | 5/2013 | Nguyen et al. |
| 2013/0160138 | A1 | 6/2013 | Schultz et al. |
| 2013/0165142 | A1 | 6/2013 | Huang |
| 2013/0204886 | A1 | 8/2013 | Faith et al. |
| 2013/0208112 | A1 | 8/2013 | Tanaka et al. |
| 2013/0263217 | A1 | 10/2013 | Avital |
| 2013/0332274 | A1 | 12/2013 | Faith |
| 2014/0362713 | A1 | 12/2014 | Agarwal et al. |
| 2023/0186412 | A1* | 6/2023 | Farrar .................... G06Q 50/12 709/225 |

OTHER PUBLICATIONS

Aloul et al., "Using Mobiles for on Campus Location Tracking", MoMM 2009, Proceedings of the 7th International Conference on Advances in Mobile Computing and Multimedia, Dec. 14-16, 2009, pp. 231-235.

Bauer, E. et al. "Service Quality of Cloud-Based Applications", IEEE Press, Piscataway, NJ. 2013. (Year: 2013). submit in 2 parts.

Chow, Raymond, "Why-Spy? An Analysis of Privacy and Geolocation in the Wake of the 2010 Google "Wi- Spy" Controversy", Rutgers Computer & Technology Law Journal 39.1, vol. 56, No. 39, Apr. 2013-Jun. 2013, pp. 23.

Clarkson, Will, "Tracking Your Every Move: iPhone Retains Extensive Location History", http://freedom-to-tinker.com/blog/wclarkso/tracking-your-evervy-move-ihone-retalins-extensive-location-history/ , Apr. 20, 2011, pp. 6.

Cox, John, "Newbury Pinpoints Wireless LAN Devices in Enterprise", Network World, Nov. 6, 2006, pp. 3.

Fantoni, Beatrice, "Wi-Fi Should Have Built-in Privacy Features: Report", Jun. 15, 2011, Calgary Herald, pp. 2.

Final Office Action mailed Jan. 6, 2020, for U.S. Appl. No. 16/193,335, filed Nov. 16, 2018, twenty-nine pages.

Final Office Action mailed Sep. 9, 2021, for U.S. Appl. No. 16/193,335, filed Nov. 16, 2018, forty-four pages.

Libelium Launches Meshlium Xtreme Providing Wireless Sensor Networks with a ZigBee Gateway to the Internet, M2 Presswire, Mar. 16, 2011, pp. 3.

Non-Final Office Action mailed Jun. 28, 2019, for U.S. Appl. No. 16/193,335, filed Nov. 16, 2018, twenty-two pages.

Non-Final Office Action mailed Jun. 6, 2023, for U.S. Appl. No. 17/813,911, filed Jul. 20, 2022, forty-four pages.

Non-Final Office Action mailed Oct. 26, 2020, for U.S. Appl. No. 16/193,335, filed Nov. 16, 2018, thirty-five pages.

Notice of Allowance mailed Apr. 7, 2022, for U.S. Appl. No. 16/193,335, filed Nov. 16, 2018, twelve pages.

Notice of Allowance mailed Dec. 21, 2023, for U.S. Appl. No. 17/813,911, filed Jul. 20, 2022, twelve pages.

Pianese, F. et al. "Discovering and Predicting User Routines by Differential Analysis of Social Network Traces". IEEE, 2013, nine pages. (Year: 2013).

Ribeiro, Goncalo, "Google Can Track your PC, iPhone, iPad, Mac, Android Phone and Other Devices", http://www.redmondpie.com/google-can-track-your-pc-iphone-ipad-mac-android-phone-and-other-devices/, Jun. 16, 2011, pp. 6.

Social Has a Shape: Why Networks Matter. IEEE. 2012 (Year: 2012).

Wi-Fi Works Where GPS Won't, eWeek, Sep. 10, 2004, pp. 2.

* cited by examiner

200

START

RECEIVE, AT A NETWORK MANAGEMENT
PORTAL SYSTEM, A CONNECTION REQUEST
FOR AN EXTERNAL SERVER FROM A USER
DEVICE                                          202

DETERMINE MAC ADDRESS OF THE USER
DEVICE                                          204

SEND THE MAC ADDRESS TO A TRAVELER
MONITORING SYSTEM                               206

AUTHORIZE USER DEVICE TO ACCESS THE
EXTERNAL SERVER                                 208

TRACK COMMUNICATIONS BETWEEN THE
USER DEVICE AND THE EXTERNAL SERVER             210

END

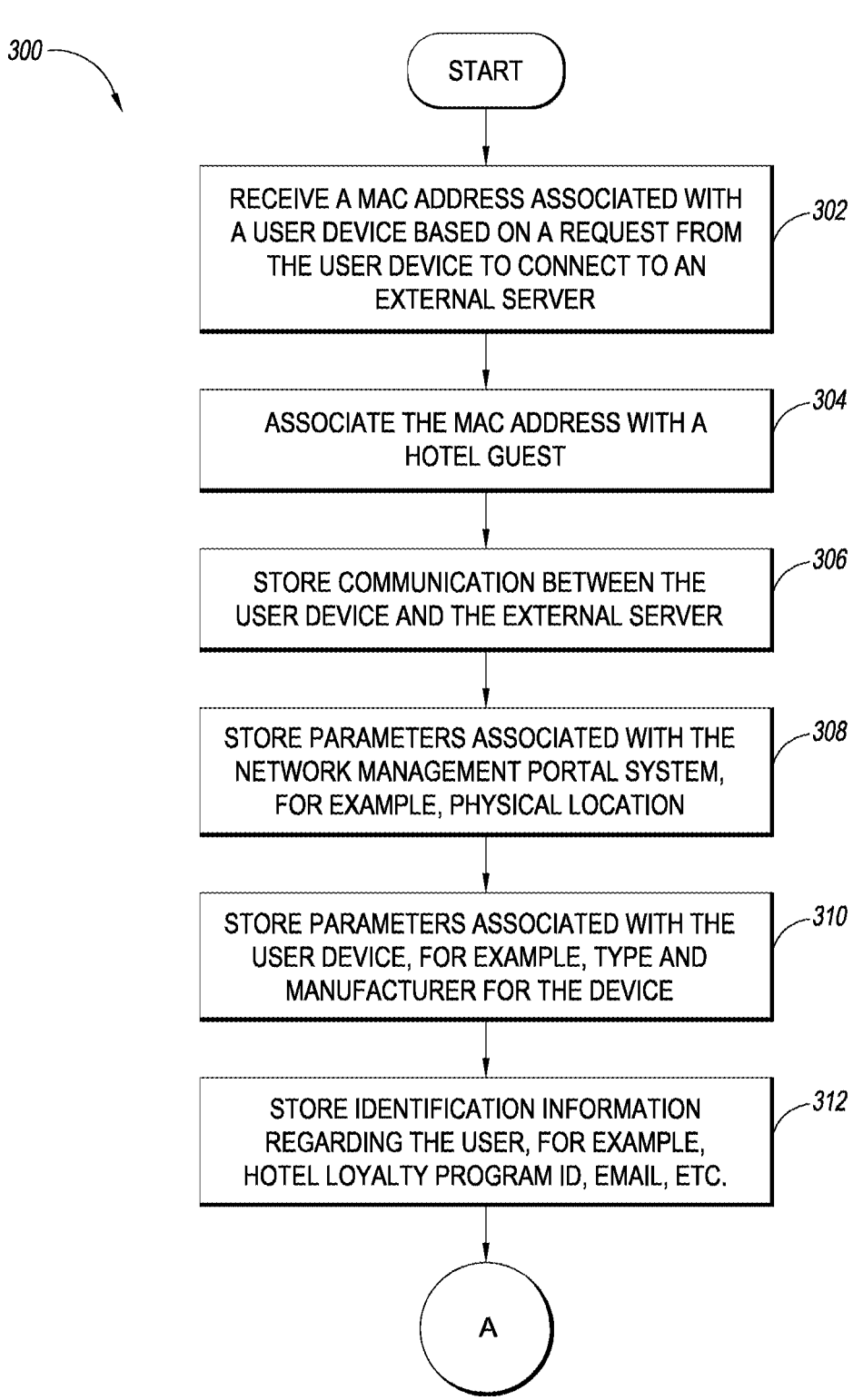

300

START

RECEIVE A MAC ADDRESS ASSOCIATED WITH A USER DEVICE BASED ON A REQUEST FROM THE USER DEVICE TO CONNECT TO AN EXTERNAL SERVER — 302

ASSOCIATE THE MAC ADDRESS WITH A HOTEL GUEST — 304

STORE COMMUNICATION BETWEEN THE USER DEVICE AND THE EXTERNAL SERVER — 306

STORE PARAMETERS ASSOCIATED WITH THE NETWORK MANAGEMENT PORTAL SYSTEM, FOR EXAMPLE, PHYSICAL LOCATION — 308

STORE PARAMETERS ASSOCIATED WITH THE USER DEVICE, FOR EXAMPLE, TYPE AND MANUFACTURER FOR THE DEVICE — 310

STORE IDENTIFICATION INFORMATION REGARDING THE USER, FOR EXAMPLE, HOTEL LOYALTY PROGRAM ID, EMAIL, ETC. — 312

TRAVELER TRACKING SYSTEM

CROSS-REFERENCE TO RELATED APPLICATIONS

This application is a continuation of U.S. patent application Ser. No. 17/813,911, filed Jul. 20, 2022, which is a continuation of U.S. patent application Ser. No. 16/193,335, filed Nov. 16, 2018, entitled "TRAVELER TRACKING SYSTEM," which is a continuation of U.S. patent application Ser. No. 14/538,580, filed Nov. 11, 2014, entitled "TRAVELER TRACKING SYSTEM," which claims priority from U.S. Provisional Patent Application No. 61/902,744, entitled "TRAVELER TRACKING SYSTEM," including Appendix A and B, filed Nov. 11, 2013, and from U.S. Provisional Patent Application No. 62/016,327, entitled "TRAVELER TRACKING SYSTEM," filed Jun. 24, 2014, all of which are incorporated by reference in their entireties.

BACKGROUND

Guests usually carry one or more electronic devices during their hotel stay. Guests may further connect their devices to the internet through the hotel's network management portal system. The hotels may require guests to pay before accessing the internet. The hotel's network management system can authorize guests to access the internet.

SUMMARY

The systems and methods described herein can be implemented by a computer system comprising computer hardware. The computer system may include one or more physical computing devices, which may be geographically dispersed or co-located.

Certain aspects, advantages and novel features of the inventions are described herein. It is to be understood that not necessarily all such advantages may be achieved in accordance with any particular embodiment of the inventions disclosed herein. Thus, the inventions disclosed herein may be embodied or carried out in a manner that achieves or selects one advantage or group of advantages as taught herein without necessarily achieving other advantages as may be taught or suggested herein.

In certain embodiments, a system described herein can include a memory and a computing system in communication with said memory. The computing system can be configured to receive data from network management systems. In some embodiments, the network management systems are configured to receive plurality of connection requests from a plurality of user devices. The network management systems may provide transmission control protocol handshake completion data responsive to said connection requests. The data received for each user device of the plurality of user devices may include one or more of the following: a device identifier included in one or more packets sent from the user device requesting access to an external network resource using a network management system at a venue; one or more attributes associated with the venue; user data associated with the user device; and connection data associated with communications between the user device and said external network resource.

The system of the preceding paragraph can have any sub-combination of the following features: wherein said device identifier comprises a MAC address; wherein said one or more attributes associated with the venue include at least one of geographical location of the venue, class identifier of the venue, distance of the venue from the airport, number of conference rooms, average price of rooms at the venue; wherein said connection data include a list of network resources requested from the user device; wherein said user data include at least one of a loyalty identifier associated with the venue and an email address associated with the user; wherein said computing system can calculate a frequency of travel of a user based in part on the received data; wherein said computing system can associate a user with the received data; wherein said computing system can determine a correlation between a first user device and a second user device based in part on the received data; wherein said computing system can determine a relationship between a first user using a first user device and a second user using a second user device based in part on the received data; wherein said computing system can generate a travel map based on received data; wherein said computing system can determine a next travel destination of a user based in part on the received data; wherein said computing system can determine out of pattern visits; wherein said computing system can calculate a loyalty metric number for a user; wherein said computing system can send content to one of said network management systems for injection into a user requested content based in part on the received data; wherein said computing system can generate an alert in response to detecting a first user at a first venue from the received data; wherein said computing system can detect clusters based in part on said one or more attributes associated with the venue included in the received data; wherein said computing system can compare one or more attributes of venues visited by a user with one or more detected clusters and determine a probability score that a user belongs to that cluster based at least on the said comparison; and wherein said computing system can generate content configured to be injected by the network management system based on said probability score.

In certain embodiments, a system described herein can include a memory and a computing system in communication with said memory. The computing system can be configured to receive data from network management systems. In some embodiments, the network management systems are configured to receive plurality of connection requests from a plurality of user devices. The network management systems may provide transmission control protocol handshake completion data responsive to said connection requests. The data received for each user device of the plurality of user devices may include one or more of the following: a device identifier included in one or more packets sent from the user device requesting access to an external network resource using a network management system at a venue, and geographical location data associated with the venue. The computing system can generate a travel map based on the received data. In some embodiments, the computer system can determine a first geographical location of a first user device requesting access to external network resources at a network management portal from a first venue at the first geographical location. Further, the computing system can identify a second geographical location that a first user of the first user device is likely to travel to next from the first geographical location.

In certain embodiments, a system described herein can include a memory and a computing system in communication with said memory. The computing system can be configured to receive data from network management systems. In some embodiments, the network management systems are configured to receive plurality of connection requests from a plurality of user devices. The network management systems may provide transmission control protocol handshake completion data responsive to said connection requests. The data received for each user device of the plurality of user devices may include one or more of the following: a device identifier included in one or more packets sent from the user device requesting access to an external network resource using a network management system at a venue and user data associated with the user device. The computing system can store association between user data with respective device identifiers; in the data store. In some embodiments, the computing system can receive a first device identifier included in one or more packets sent from a first user device requesting access to an external network resource using one of said network management systems. Further, the computing system can determine if the first device identifier is included in the data store. The computing system can also associate the first device with one of the users stored in the data store based in part on the received data.

In some embodiments, a method for managing visitors of a venue can include detecting a plurality of requests for connection to network resources during visits at a plurality of venues from a user device associated with a first user. The method can further include tracking the visits based in part on a device identifier of the user device retrieved from said connection requests. In some embodiments, the method can include determining a loyalty metric score for the first user based in part on said tracking. The method can also include adjusting traveler treatment based in part on the determined loyalty metric score.

BRIEF DESCRIPTION OF THE DRAWINGS

Embodiments disclosed herein are described below with reference to the drawings. Throughout the drawings, reference numbers are re-used to indicate correspondence between referenced elements. The drawings are provided to illustrate embodiments of the inventions described herein and not to limit the scope thereof.

FIGS. 3A-B illustrate an embodiment of a process for determining the next travel destination of a guest.

DETAILED DESCRIPTION

I. Introduction

Figure 1:
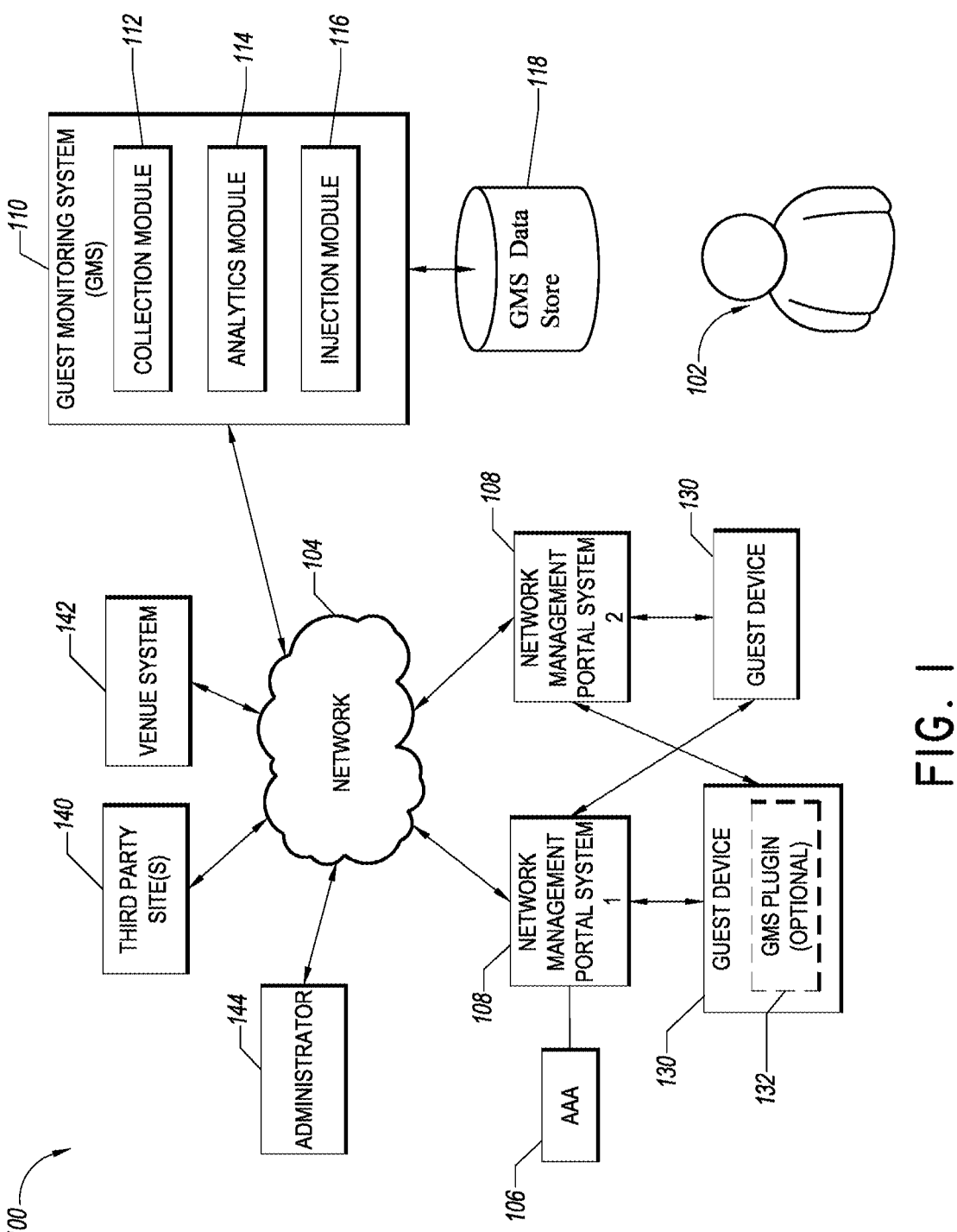
FIG. 1 illustrates an embodiment of a computing environment including a guest monitoring system that can enable hotels to monitor their guests' travel patterns.

Guests typically carry one or more electronic devices during their stay at a hotel. Furthermore, guests may also want to use their electronic devices to connect to the internet during their stay. Hotels can provide a network management portal system to enable guest devices to connect to the internet. Before authorizing connection, hotels may require guests to enter credit card or other login information. This information is, however, limited and may not allow hotel operators to analyze the preferences and travel patterns of their guests. Preferences may include, for example, location of the venue such as whether a hotel is located in downtown or close to the airport or attributes of the venue such whether a hotel has meeting rooms. For instance, a hotel chain operator may want to know why in a particular city, their guest is staying at a different hotel instead of one of their hotels. Hotel operators may also want to know the next likely destination of their guest. Moreover, hotel operators may want to target frequent travelers (road warriors) and it may be beneficial to know their loyalty to a particular chain and other preferences.

This disclosure describes embodiments of a guest monitoring system that can track guests and provide hotel operators with data analysis to increase their customer satisfaction and business efficiency. For example, the guest monitoring system can identify and alert hospitality services (e.g. hotels, coffee shops, restaurants, etc.) potentially valuable customers previously unknown to the service. This recognition can be provided in real time to on-site venue managing systems, informing them that a potentially valuable traveler has arrived on premise. In some embodiments, real time includes less than 10 seconds, or less than 30 seconds, or less than 1 minute. In some embodiments, the reports generated by the guest monitoring system may be delivered weekly or monthly. The alerts and/or reports can be used by services to offer special or directed treatment to the valuable traveler, thereby creating a positive impression on the traveler concurrent with his stay. In another aspect, information can be provided in various batch-oriented modes to support service individualization, promotional campaigns, upselling, or simply better understanding of travelers.

Accordingly, in some embodiments, the guest monitoring system can track travelers by recognizing their use of internet access from hotel rooms and other locations associated with the non-permanent stay. These include coffee shops, restaurants, stadia etc. Travelers can be classified by frequency of travel, hotel chain preferences, property preferences, cities visited and other visitation patterns. Visit data can be added to the record, including property identifiers, property attributes, room preferences, length of stay, room costs, etc. The guest monitoring system can capture the visitation data in real time using network management portal systems. The location of the network management portal system can provide additional specifics. Location can include geographical location of the venue or a relative location within a particular venue. In some embodiments, the location information is stored in a memory of network management portal. For instance, in the case of a hotel property, additional details may include hotel information, room information, rate schedules, features, and room charges. Additional characterization of each specific location can also be gathered from public domain sources. The GMS can automatically retrieve the specific data.

Moreover, confidentiality of the traveler can be preserved as per the standards described in the Fair Credit Reporting Act. For example, instead of using names, the traveler can be identified with a code. The code may be related to the device used for accessing network such as a MAC address or loyalty number. In some instances, each venue system may provide an additional identifier, derived from their loyalty program or registration information. Delivery of alerts and other information to a venue system can be in the form of reports, bulletins or special analyses. Further, marketing information derived from the guest monitoring system can be provided as lists or database files, keyed by a traveler identifier. The venue systems can subsequently personalize the information. For products or services which involve the delivery of real-time alerts to an on-site venue system indicating the presence of a potentially valuable patron, these may use some non-personal identifier (a hotel room number, for example). Accordingly, confidentiality of the traveler can be preserved.

In some embodiments, the guest monitoring system can provide teal time information to a specific venue location about a specific visitor via a lightweight application, running on a network management portal system. This application can support push or pull notification from the guest monitoring system. A venue system may trigger certain analytics as needed. This may be supported by a TCP protocol built into the application.

II. Example Guest Monitoring System

FIG. 1 illustrates an embodiment of a computing environment 100 for providing venue operators with access to a guest monitoring system 110 that can assist venue operators in tracking their guests and travel patterns. In an embodiment, a venue operator can be a hotel or a chain of hotels. Venue operators can also include coffee shops, restaurants, events centers or any operators providing their guests access to internet or an external network through a network management portal system 108. Hotel operators can use the guest monitoring system 110 to monitor their guests, for example, to track travel patterns and to determine guest loyalty.

In the computing environment 100, the network management portal system 108 can facilitate a request from a guest device 130 to access an external resource on a network. The external resource can be, for example, a website. In an embodiment, the network management portal system 108 includes a gateway device. In other embodiments, the network management portal system 108 can include an access point and a controller. In the process of facilitating the request from the guest device 130 to access the external resource, the network management portal system 108 can determine a unique identifier associated with the guest device 130. The unique identifier can be the MAC address of the device 130. In some embodiments, the unique identifier can include email address or other identifying information that may be supported by 802.11u and Hotspot 2.0 standards. In further embodiments, the unique identifier can be associated with credentials stored in the SIM card of the device 130. The unique identifiers may be associated with the network interface of the device 130. As an example, many laptops have two network interfaces, one for wired connections and one for wireless connections. Each of these may have a separate MAC address. The network management portal system 108 can send the unique identifier along with other information associated with the device 130 and its user to the guest monitoring system 110. The network management portal system 108 can also capture communications between the device 130 and the external site. For example, the network management portal system 108 can capture packets received from the guest device 130 and store some or all of the packets in a data repository 118. The network management portal system 108 can send this captured communications data to the guest monitoring system 110. The network management portal system 108 may include an internal memory for storing network management portal system attributes and/or captured packet data. The network management portal system attributes may include location information and/or venue specific parameters. In some embodiments, the portal system attributes may be stored externally from the network management portal system 108 in a data repository.

In some embodiments, the network management portal system 108 can require authorization before allowing guest devices 130 to access the external resource. Some embodiments of the network management portal system 108 implementing the authorization process are described more in detail in U.S. patent application Ser. No. 13/659,851, filed Oct. 24, 2012, titled "Systems and Methods for Providing Content and Services on a Network System," incorporate herein by reference in its entirety. The network management portal system 108 may retrieve the unique identifier of a guest device 130 from a connection request from the guest device 130. For example, the network management portal system 108 may receive a request for a connection to an external network from a guest device 130. The network management portal system 108 may send transmission control protocol handshake data to the guest device 130 in response to receiving the request for connection. The request may include one or more packets. In some embodiments, network management portal system 108 may retrieve an identifier from the packets. In an embodiment, the identifier includes the MAC address of the guest device 130. In some embodiments, the network management portal system 108 may include one or more hardware processors to determine whether the user is authorized based on identifier of the guest device 130. The network management portal system 108 may redirect the guest device 130 based in part on determining whether the guest device 130 is authorized to access an external resource.

In an embodiment, the collections module 112, included in the guest monitoring system (GMS) 110, can receive the MAC address or other identifier of the device 130 along with user data associated with the user of the device 130. This user data may include credit card information, room number, or personal user identification information (e.g. email address, phone number, hotel loyalty number, social networking account, login ID, etc.). The guest monitoring system 110 can receive some or all of the data from the network management portal system 108. In some embodiments, the guest monitoring system 110 can also receive data from third party sites 140 or the venue operator systems 142. For example, the venue operator systems 142 can include a hotel PMS system. The collection module 112 can store all the information associated with the device 130 and its user including the MAC address in a user data repository 118. Accordingly, the user of the device 130 can be tracked by the guest monitoring system 110 based on the MAC address.

In some embodiments, the GMS 110 can determine patterns of users based on connection requests. The following example illustrates how the GMS 110 can determine travel patterns of guests from hotel visits. A hotel may include a network management portal system 108 to allow their guests to access internet or other network resources. When a device 130 sends out a request for connection, the guest monitoring system 110 can determine whether it has seen this device 130 before based on the MAC address of the device 130. For example, the guest monitoring system 110 may have stored this device information before based on a prior visit to a same or a different hotel. If there is no record of the MAC address for the device 130, the guest monitoring system 110 can store the MAC address of the device and the corresponding profile information (for example, manufacturer of the device, type of device, guest information, hotel information etc.). The hotel information can include geographical location of the hotel and other property details. If there is a record of the MAC address in the repository 118, the guest monitoring system (GMS) can update the record with the new connection information.

As an example, a guest 102 having a smartphone and a laptop checks into Hotel A in City 1. A network management portal system 108, at Hotel A, can receive a request for connection to the internet from the smartphone. The network management portal system 108 can send the MAC address associated with the smartphone to the guest monitoring system 110 along with other information described above. Similarly, the network management portal system 108 can also send the MAC address of the laptop to the GMS 110 when it receives a connection request from the laptop. The GMS 110 can associate the MAC addresses of the laptop and the smartphone with the hotel guest 102. The guest 102 then travels to City 2 and checks into Hotel B. A network management portal system 108, at Hotel B, can receive request for connection to the internet from the laptop. The network management portal system 108 can subsequently send this data to the GMS 110. The GMS 110 can determine whether this MAC address is in the repository. In this example, the laptop was previously stored during connection request at Hotel A. The GMS 110 can update the records and include travel pattern, for example, City 1 to City 2. The GMS 110 can also store where the guest stayed in each of those cities. Accordingly, the GMS 110, can store guest travel patterns.

The collection module 112 can automatically consolidate multiple devices, each including a MAC address, to a single user. The collection module 112 can use tracked communications (e.g. email address, loyalty number, name, or other personal information) in conjunction with other stored data to consolidate multiple devices. When a guest uses a new device with a new identifier to access a network, the collections module 112 can maintain continuity based on other MAC addresses associated with the guest and tracked communications as described herein. The participating location (venue) may also provide additional information about the guest and his or her visit, including room number. In some cases, the guest monitoring system 110 can retrieve the guest's loyalty program ID. Accordingly, the guest monitoring system 110 can use some or all of this data to link the new device to past history. In certain embodiments, the linking of devices to a user can advantageously offer persistence of guest information over an extended period of time.

The analytics module 114 can perform various analytics on the data stored repository 118. For example, based on plurality of guests' travel patterns identified from tracking MAC addresses, the GMS 110 can create a travel map. The travel map can indicate travel hubs and hopping probabilities between different cities. The guest monitoring system 110 can identify based on the guest's own travel patterns and the travel map where the guest is most likely to go next. For example, the guest monitoring system 110 can identify in one embodiment that a guest staying in a hotel in New York is most likely to travel to Boston next. Based on this information, the content injection module 116 can insert content (e.g. advertisements) through the network management portal system 108. The content injection module can also insert content based on device type which can automatically be identified by the GMS (based on MAC address and device information received by the network management portal system 108). If the same device (e.g. an iPhone) is seen for a certain period of time, the analytics module 114 can identify that the device is an iPhone and may suggest Samsung advertisements to the guest. The GMS 110 can also monitor for how long has the user been using a particular device and determine if they would likely be looking for a new device based on the detected time of usage.

The analytic module 114 can also determine out of pattern information. For example, the analytics module 114 can determine that a guest stays in Hotel chain A in most cities, but stays in Hotel chain B in some cities. Using this information, Hotel A can target the guest in the cities that the guest is staying in Hotel B.

The analytics module 114 can also identify frequency of hotel stays for the guests and offer service based on the frequency. For example, some hotels may want to offer special services to road warriors. Frequency may depend on number of visits to hotels in a given time period. The time period may be one year or less. In some embodiments, the time period may be more than a year and may correspond to a lifetime of a user.

The administrator system 144 can provide one or more user interfaces to manage and access the guest monitoring system 110.

The guest monitoring system 110 can be implemented in computer hardware and/or software. The guest monitoring system 110 can execute on one or more computing devices, such as one or more physical server computers. The network management portal system 108 may also implement some or all modules of the guest monitoring system 110. In implementations where the guest monitoring system 110 is implemented on multiple servers, these servers can be co-located or can be geographically separate (such as in separate data centers). In addition, the guest monitoring system 110 can be implemented in one or more virtual machines that execute on a physical server or group of servers. Further, the guest monitoring system 110 can be hosted in a cloud computing environment, such as in the Amazon Web Services (AWS) Elastic Compute Cloud (EC2) or the Microsoft® Windows® Azure Platform. The user devices 130 can be desktops, laptops, netbooks, tablet computers, smartphones, smartwatches, PDAs (personal digital assistants), servers, e-book readers, video game platforms, television set-top boxes (or simply a television with computing capability), a kiosk, combinations of the same, or the like.

Figure 2:
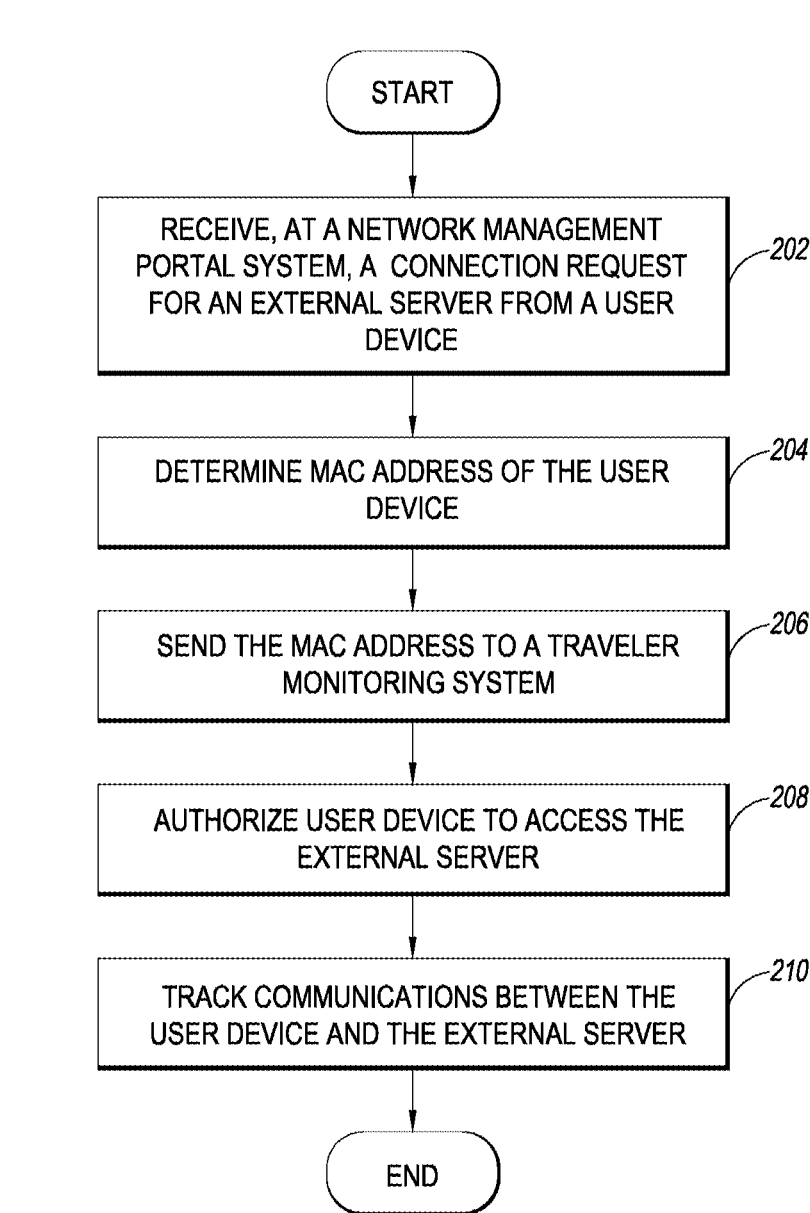
FIG. 2 illustrates an embodiment of a process for tracking guest information at a network management portal system.

FIG. 2 illustrates an embodiment of a network management process 200. The network management process 200 can be implemented by any of the systems described above. In an embodiment, the network management process 200 can be implemented in a network management portal system 108. The network management process 200 can begin at block 202 where a network management portal system may receive a request for connection to access an external server from a user device. The connection request may include a device identifier of the user device. The device identifier can be include, for example, in the network packets. In some embodiments, the device identifier can be a MAC address of the user device. Accordingly, at block 204, the network management portal system 108 can extract MAC device of the user device from the connection request. In some embodiments, the network management system 108 can send the device identifier to guest monitoring system 110 at block 206. As discussed herein, the guest monitoring system 110 may be implemented external to the network gateways system 108. In some embodiments, some or all of the modules of the guest monitoring system 110 may be implemented in the network management portal system 108. In some embodiments, the network management system 108 may determine whether the user device is authorized to access external network resources at block 208. The authorization may depend on the MAC address of the user device. Authorization and the transmission control protocol handshake completion is discussed more in detail in application Ser. No. 14/094,712 titled "Systems and Methods For Providing Content and Services on a Network System," incorporated herein by reference in its entirety. At block 210, the network management system 108 can track communications between the user device and network resources once a connection is established. For example, the network management system 108 can store all the requested network resources. the network management system 108 can also store some or all of the packets in the communication. In some embodiments, the network management system 108 can send tracked data to the GMS 110 for storing in data repository 118.

Figure 3B:
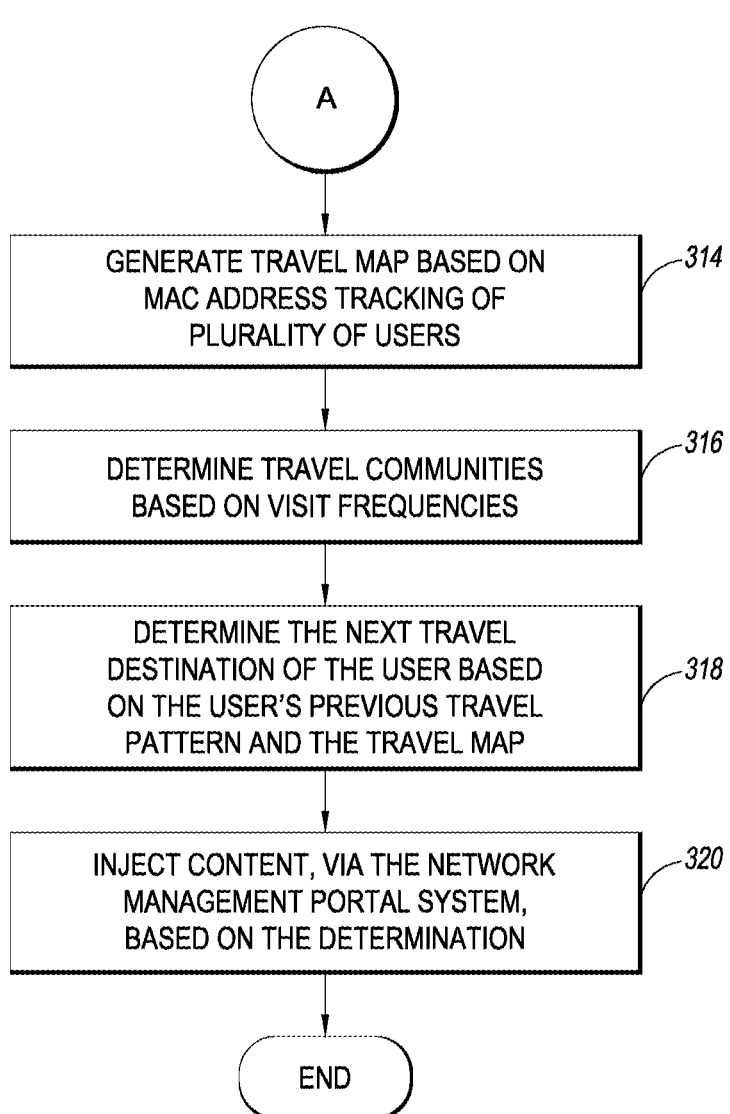

FIGS. 3A-B illustrates an embodiment of a guest tracking process 300 that can be implemented by any of the systems described above. Referring to FIG. 3A, at block 302, the guest monitoring system 110 can receive a MAC address or a device identifier associated with a user device attempting to connect to external server from a hotel or other venue. As discussed above, the MAC address may be received from a network management portal 108 at the hotel. At block 304, the GMS 110 can associate the MAC address of the user device with a hotel guest. For example, the GMS 110 can lookup previously stored MAC address in data store 118 to identify the hotel guest. If the MAC address is not found in the data store 118, the GMS 110 can determine if the device belongs to a user already in the system or if it belongs to a new user as discussed below. For new users, the GMS 110 may include a new entry in the data store 118.

Furthermore, at block 306, the GMS 110 may store communication data between the user device and network resources. As discussed above, the network management portal 108 can track communications from user devices. Communication data can include, for example the URL sites that the user is visiting or search data such as restaurants or movies. The GMS 110 can associate communication data with the user in the data store 118. The GMS 110 can also receive parameters or attributes related to a venue at block 308. In some embodiments, the GMS 110 can receive attributes related to a venue from a network management portal system 108 that manages access to network resources for users visiting a particular venue. The network management portal system 108 may store attributes such as hotel location, hotel star classification, conference rooms in the hotel, etc. in its memory. In some embodiments, the network management portal system 108 may retrieve the attributes from a data repository external from the network gateway system 108. The network management portal system 108 can send the venue attribute data to the GMS 110. The GMS 110 can associate the venue attribute data with the user and a particular visit data. In some embodiments, the GMS 110 can receive a venue name or other venue identifiers (such as location coordinates) from the network management system 108 that may enable the GMS 110 to retrieve venue attribute data.

In some embodiments, the GMS 110 can also receive and store parameters associated with the user device at block 310. The user device parameters may include, for example, device identifiers, device type (laptops, smartphones, tablets, smartwatch, etc), device operating system, device manufacturer, and device network operator (AT&T, Verizon, etc). In some embodiments, the network management system 108 can extract device parameters automatically from the device.

Further, at block 312, the GMS 110 can receive and store user data associated with a user requesting connection using a network management system 108. The user data can include, for example, hotel loyalty ID, email address, home address, phone number, user ID, password, credit card data, etc. In some embodiments, the network management portal 108 can extract user data from communications received from the user device and send the user data to GMS 110. The user device data may also be received from hotel systems such as property management systems. In some embodiments, the network management system 108 can receive room number from the connection request and identify user data from hotel systems based on the room number. User data may also be obtained during authorization of a user device to access network resources. The GMS 110 can associate received user data with a user and a particular hotel visit in the data store 118. Accordingly, the data store 110 can include data corresponding to users linked with user devices and correlated with hotel visits including attributes of hotels and communication data. In some embodiments, the data store 110 can automatically collect all the communication data, user data, device parameter data, and hotel attributes.

The GMS 110 can analyze the stored data in the data repository 110 as described herein. In some embodiments, the GMS 110 can use some of the data in the data repository 110 to generate a travel map as illustrated in FIG. 3B. For example, the GMS 110 can monitor several guests as they move from one hotel to another in different cities as discussed above. Accordingly, the GMS 110 can identify travel hubs based on visit frequencies at block 316. In some embodiments, the GMS 110 can use the travel map to identify a next travel destination of the user based on at least one of the following: user's previous travel pattern, the generated travel map, and communication data. For instance, the GMS 110 may determine that a user accessing internet from a hotel in London is most likely to visit Paris next based on travel map probabilities. Further, the GMS 110 can determine from data store 118 that the user had visited Paris after London on a previous trip. In some embodiments, the GMS 110 can access tracked communication data from the network management portal system 108. For instance, the GMS may identify from the tracked communications that the user is searching for restaurants in Paris or checking in to a flight. Accordingly, the GMS 110 can use one or more of these metrics determine a user's next travel destination. In some embodiments, the GMS 110 can inject content through the network management portal system 108 based on the determination of the next travel city. Content may include, for example, advertisement for a hotel or restaurants or deals related to the next travel destination.

Content injection via a network portal system 108 is described more in detail in U.S. patent application Ser. No. 13/659,851.

Figure 4:
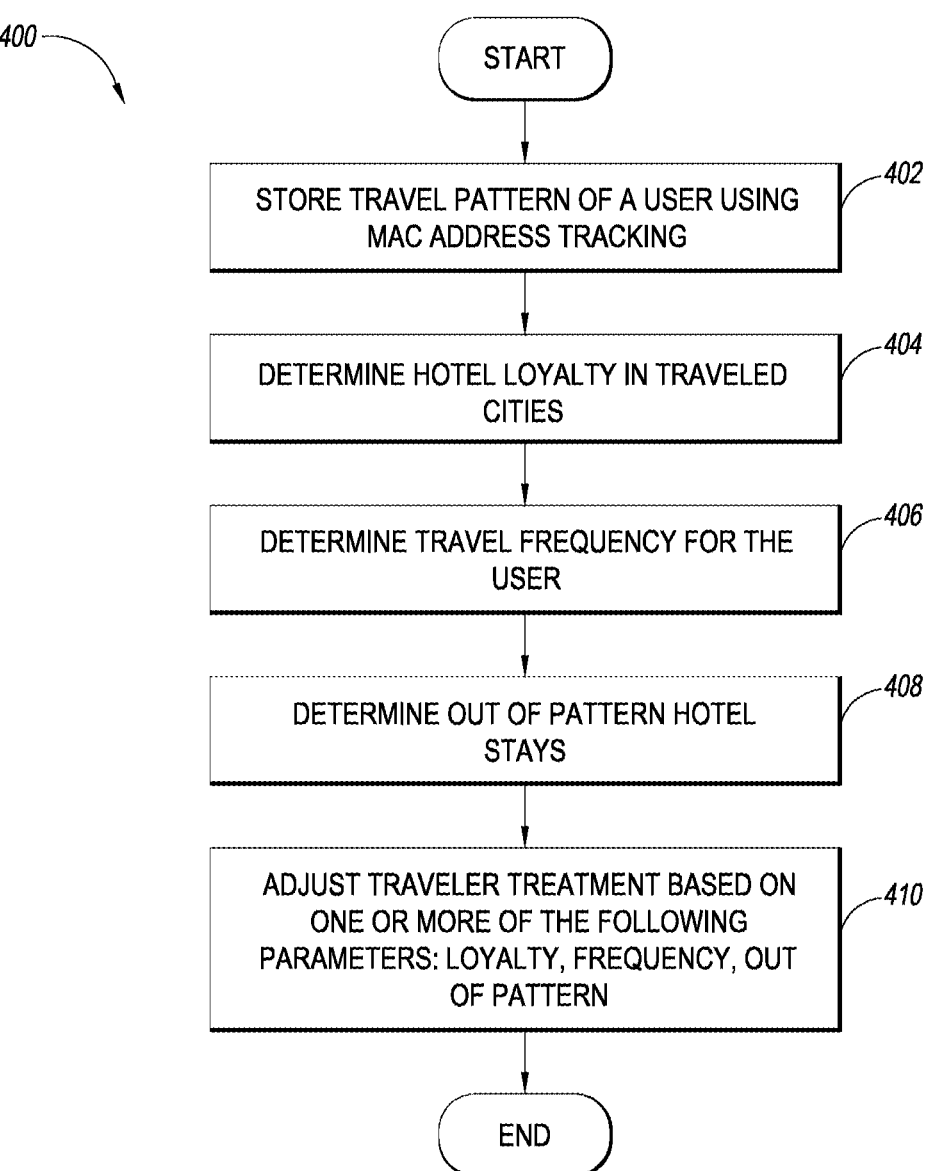
FIG. 4 illustrates an embodiment of a process for determining out of pattern hotel stays for a guest and adjusting guest treatment level by the hotel.

FIG. 4 illustrates an embodiment of a guest analytics process 400 that can be implemented by any of the systems described above. Some examples of travel map and predictive analysis are described in Appendix A and B of the provisional application, Application No. 61/902,744, the appendices and the provisional application incorporated herein by reference. As discussed above, the GMS 110 can use stored data in data repository 118 for analysis. In one embodiment, the GMS 110 can identify high frequency travelers and/or out of pattern hotel stays from the stored data. Furthermore, the GMS 110 can also generate alerts or reports to modify traveler treatment based on the analysis. Traveler treatment may include vouchers, free wifi, travel points, or any other service valued by a traveler. As illustrated in FIG. 4, the process 400 can begin at block 402 with storing travel patterns of users as discussed above with respect to FIG. 3A. The GMS 110 can determine hotel loyalty of users in traveled cities based on data stored in repository 118. In some embodiments, hotel loyalty may depend on the number of visits to a particular city and a number of times the user has stayed with a particular hotel. For example, if the user has made 10 visits to London in the last 3 months and has stayed in Hotel A for 6 of those visits, the hotel loyalty for Hotel A may be 60%. Further, at block 406, the GMS 110 may determine that the user is a high frequency traveler depending on the number of visits in a given time period. Hotel chains may be interested in targeting high frequency travelers and luring them to stay at their hotels. Thus, in the example above, the hotel may want to target the high frequency traveler to increase his or her loyalty score from 60%. In some embodiments, the GMS 110 can also determine out of pattern hotel stays at block 408. For example, a particular guest may be staying at Hilton in most cities, but Marriott in some cities. The GMS 110 can identify such patterns based on the stored data in the data repository 118. Further, at block 410, the GMS 110 can generate an alert or a report for a hotel management system to adjust traveler treatment based on the identified pattern. In some embodiments, the GMS 110 can send a text alert to a hotel manager or send an alert to hotel system when the valued user is checking in.

Figure 5A:
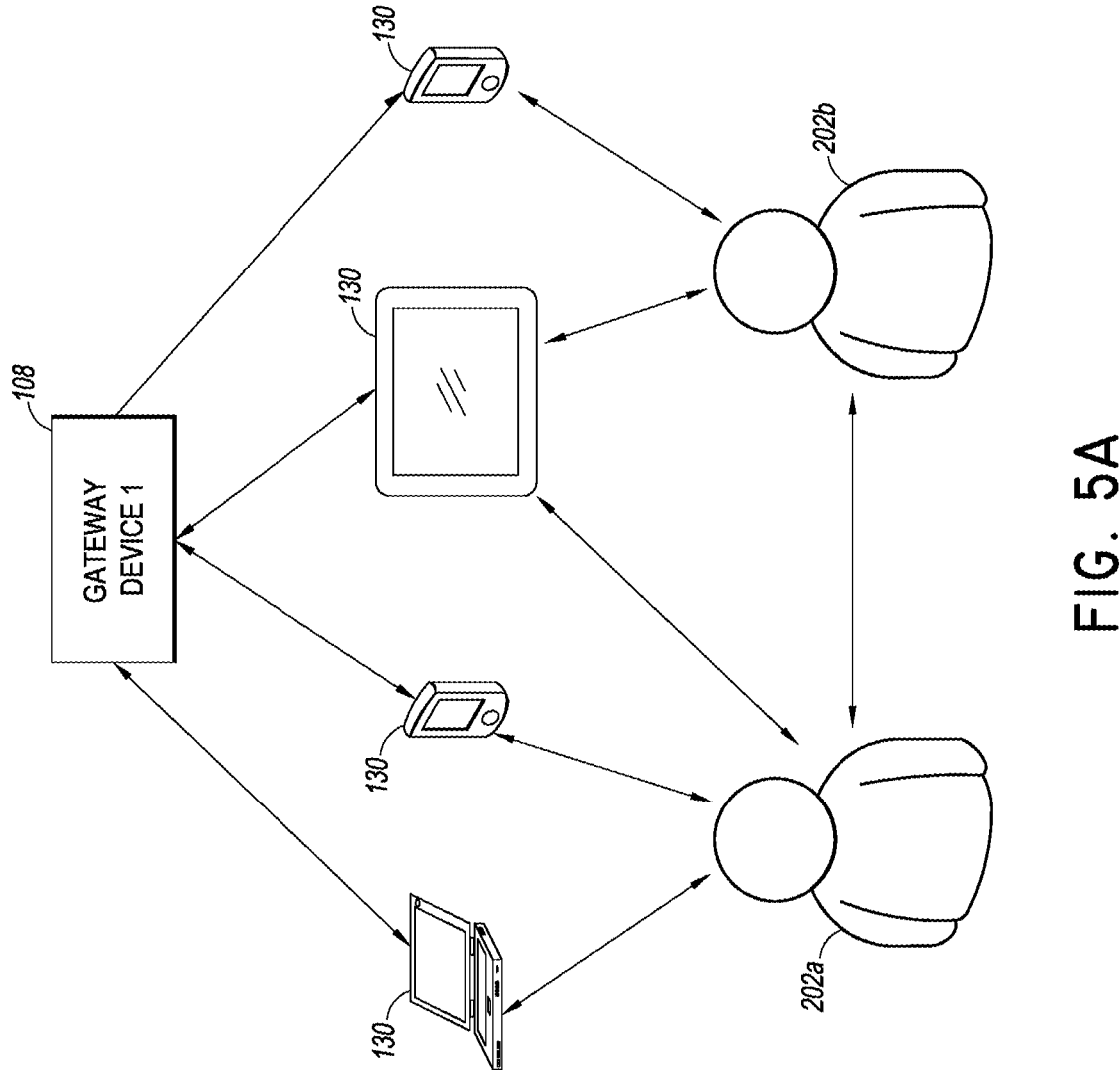
FIG. 5A illustrates an embodiment of a network management portal device managing multiple guest devices.

FIG. 5A illustrates a mapping of multiple users sharing devices 130. The guest monitoring system 110 can automatically determine which users are associated with the devices 130 based on tracked user data stored in data repository 110. In one embodiment, the guest monitoring system 110 can identify a user using a shared device based on the tracked communications (for example, email address). The GMS may also use room number or other personal user data to identify whether there is any relationship between user devices 130. For example, the GMS 110 can determine whether a laptop and a smartphone are being used by a same user based on stored data in data repository 118. The GMS 110 can compare, for example, login information, loyalty number, location, room number, or personal data such as email address, etc to determine the relationship.

Figure 5B:
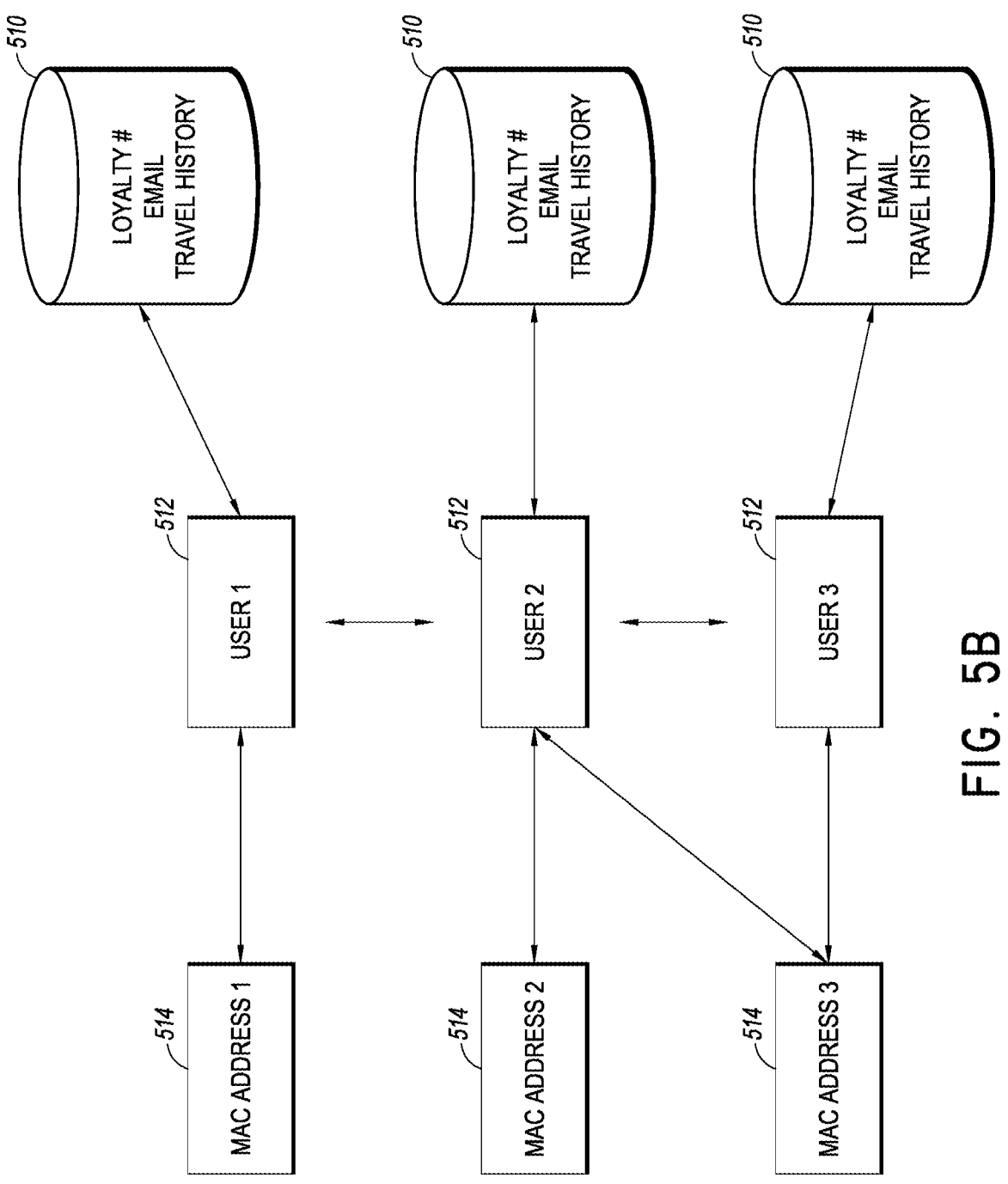
FIG. 5B illustrates a mapping of guests and their associated information based on their device MAC addresses stored in a database.

FIG. 5B illustrates a mapping of devices 514, users 512, the associated information 510 stored in data repository 118.

Figure 6:
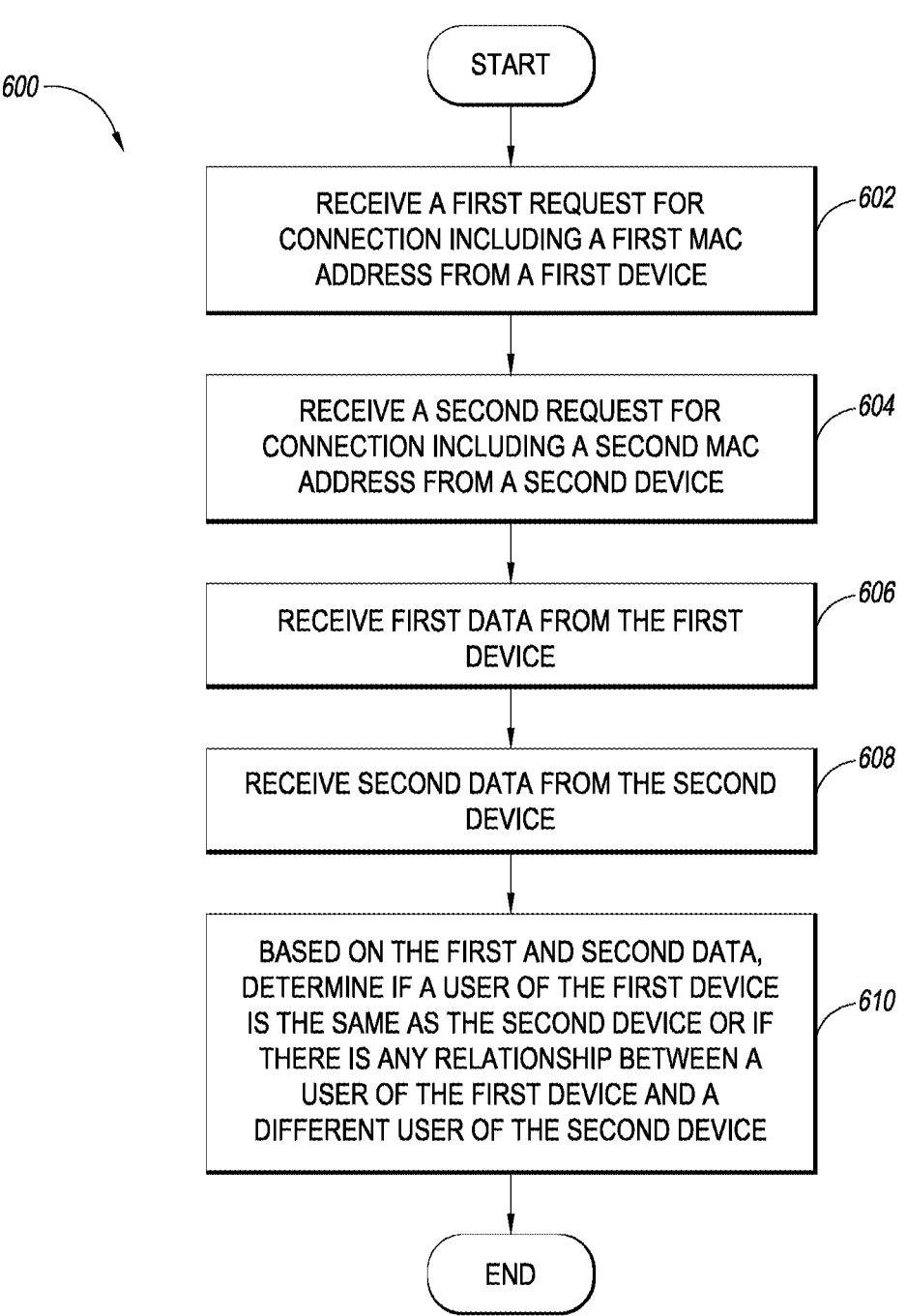
FIG. 6 illustrates an embodiment a process for determining an association between two hotel guests.

FIG. 6 illustrates an embodiment of a multiple user association process 600 that can be implemented by any of the systems described above. For example, the GMS 110 can identify if there is a relationship between users of particular devices. Some examples of relationship include: husband-wife, coworkers, etc. The GMS 110 can automatically identify the relationship based on the MAC addresses and the tracked communication. As discussed above, the GMS 110 can compare data corresponding to individual user devices and tracked communications to determine relationship between users. The GMS 110 can also query hotel systems to retrieve guest count in the room or whether guests in separate hotel rooms were paid using same company credit card. The GMS 110 can inject content based on the relationship, for example, spa advertisement when the wife is visiting with husband or a sports game advertisement when coworkers are around.

Figure 7:
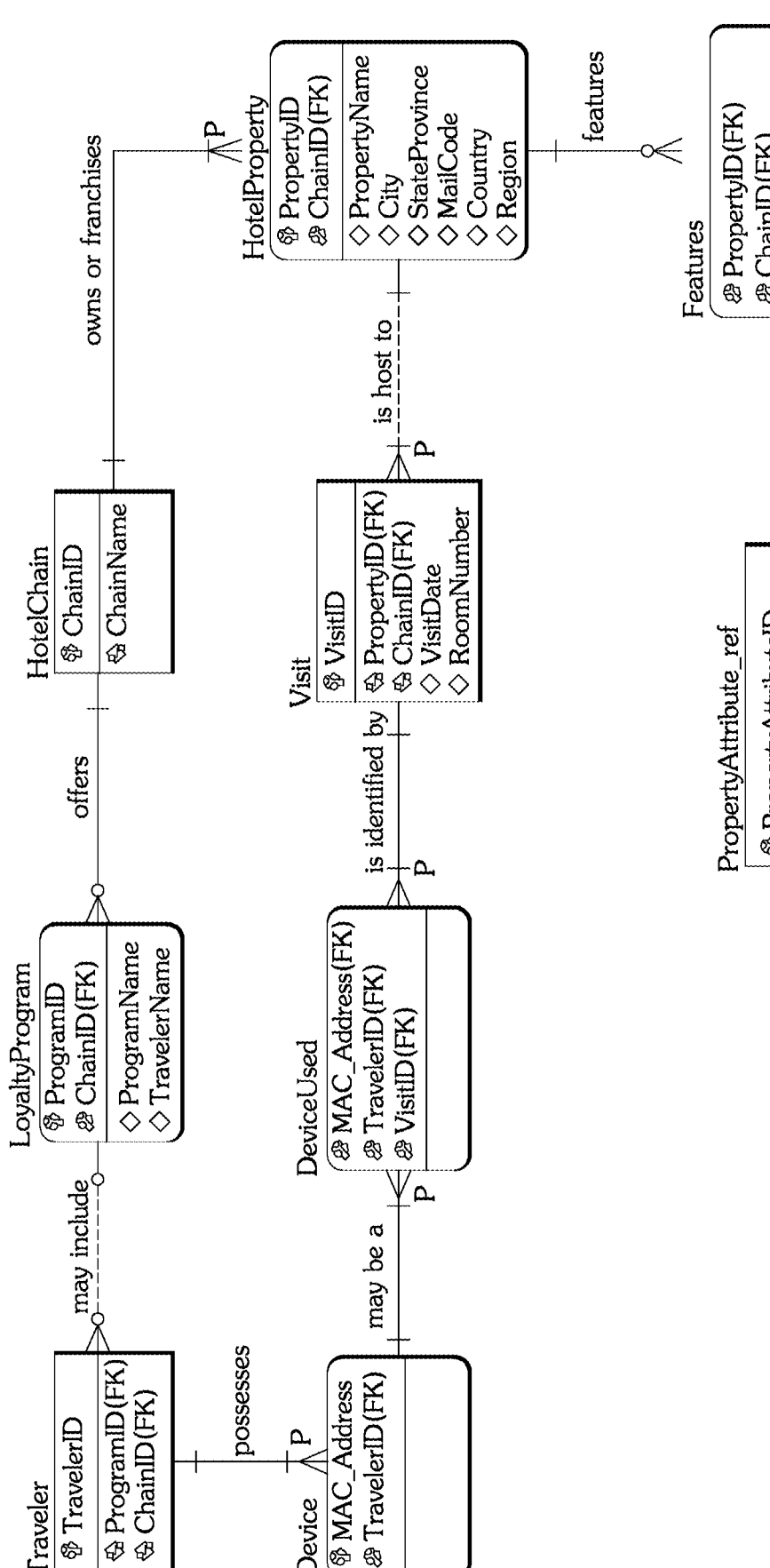
FIG. 7 illustrates an embodiment of a logical data model for storing information about users and visits.

FIG. 7 illustrates an embodiment of a logical data model that can be used by the guest monitoring system 110 to store information about users and visits in one or more data stores 118. Hotel chains typically own or franchise properties. Properties can include many property attributes, which can be provided by the property system 142 or stored in network portal system 108, the chain system, and/or $3^{rd}$ party vendors of property information. These may include pricing structures, customer ratings, locale, neighborhood information and much more. To protect a traveler's confidentiality, the basic traveler entity may be keyed by a unique number assigned by the guest monitoring system 110. In an embodiment, a traveler is defined on at least one visit where an internet access is made through a property's network management portal system 108. As described above, the traveler can access the internet through one or more devices, each of which may have a unique identifier (e.g., a MAC Address). A visit can be captured as a result of the traveler's use of one or more devices. The many-to-many relationship illustrated in FIG. 7, such as the Device—DeviceUsed—Visit association implies that a visit can be defined on one or more MAC Addresses.

Figure 8:
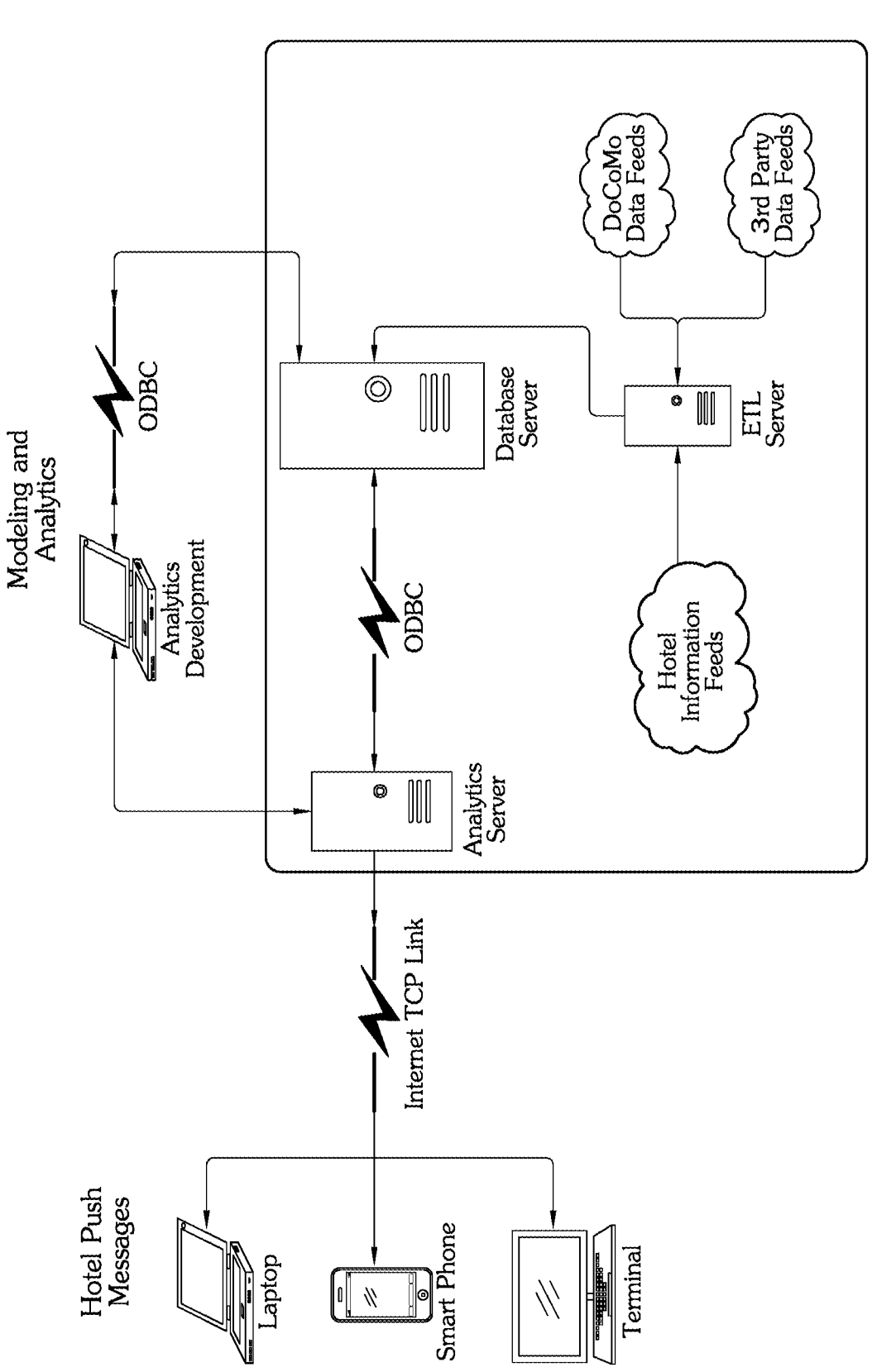
FIG. 8 illustrates an embodiment of a guest monitoring system that can send messages to the user devices based on the analytics processes.

FIG. 8 illustrates an embodiment of a guest monitoring system 108 that can send messages to the user devices 130 based on the analytics processes described herein. The messages may include, for example, offers or advertisements. The components of the guest monitoring system 110 can follow a relational database system model, such as Teradata, capable of supporting high workloads. Workload can include concurrent query processing, loading, and transformation. The system 110 can receive feeds around the clock from participating locations, $3^{rd}$ party and network management system data feeds. The guest monitoring system 110 may need to process millions of records, which can be queried, updated, and loaded every day.

III. Analytics

Figure 9:
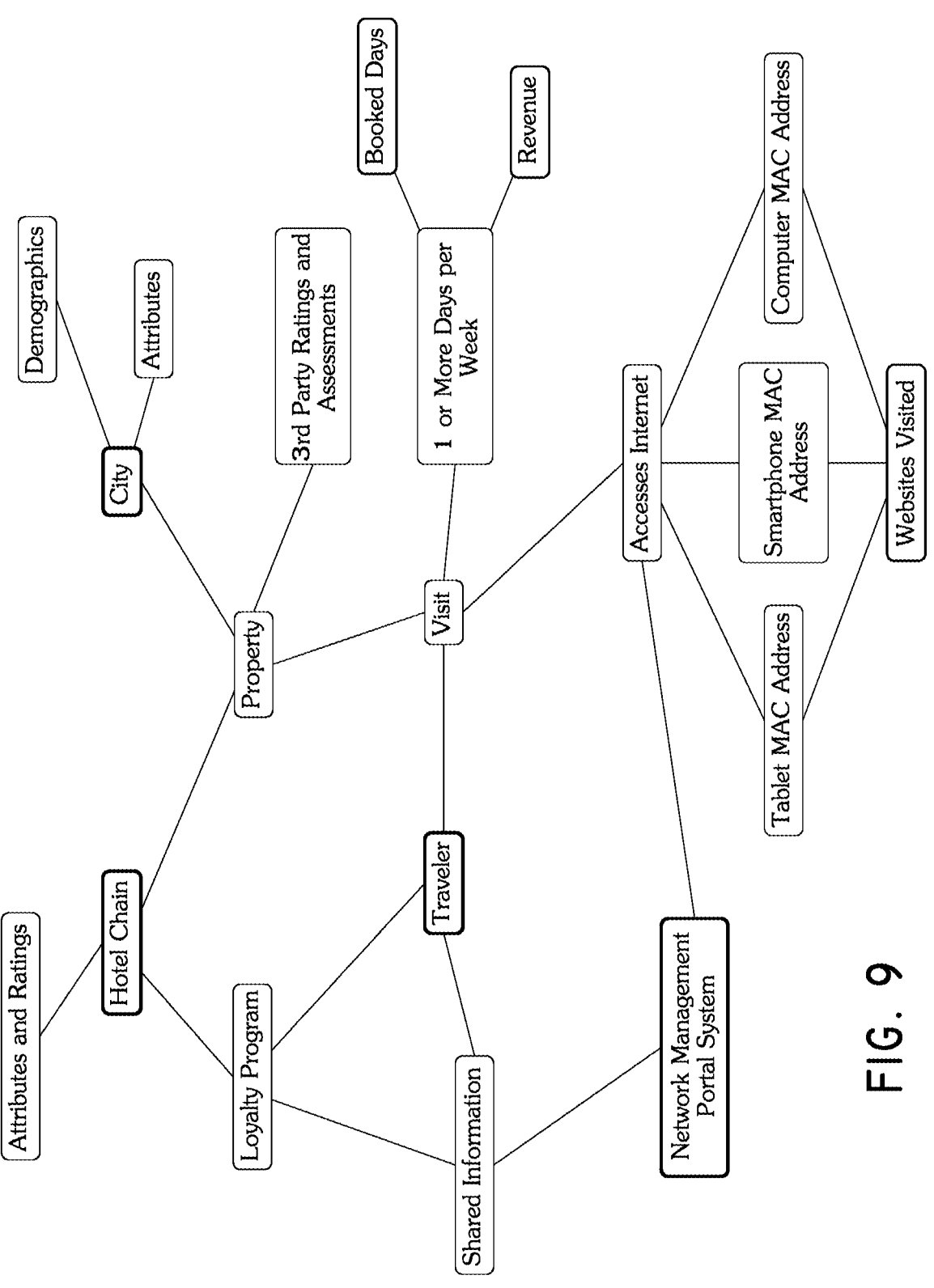
FIG. 9 illustrates an example information connectivity model for a guest monitoring system.

FIG. 9 illustrates an example information connectivity model for a guest monitoring system 110. The data corresponding to this model can be stored in data repository 118. The guest monitoring system 110 can implement variety of data analytics models using the analytics module 114. The models can include, for example, social network analysis (SNA), neural network algorithms, machine learning algorithms, clustering, regression, or data exploration. In an embodiment, the data relating to the cities and venue can be obtained through third party providers and public domain records.

In some embodiments, the guest monitoring system 110 can calculate derived data using the collected data. Derived data can enable venues to identify one or more relationships between the user and venues. Derived data can also include numbers, charts and/or graphs. An example of derived number data is a loyalty metric number. The loyalty metric number corresponds to a comparison of visits by a traveler to a first subset of venues over a total number of visits by that traveler to a second subset of venues. The visits metric may depend on the type of venue. For example, for a hotel venue, visit metric may relate to numbers of nights stayed at a hotel room or length of stay. In some embodiments, each week of stay may constitute one visit. A set of consecutive day stay may also count as one visit. As an additional example, in the case for a coffee shop, restaurant, or other service provider venue, each time a payment is made or a service is used may constitute one visit.

In one embodiment, the loyalty metric number is a ratio of visits by a traveler to a property as a percent of total visits by that traveler to all properties. As an example, a traveler may have stayed in hotels for ten weeks in the last year. Using the metric of one week as one visit, then that's ten visits in the last year. If out of those ten visits, the traveler stays at Hotel A for 3 weeks (3 visits), Hotel B for 3 weeks (3 visits), and Hotel C for 4 weeks (4 visits); then the loyalty metric numbers for Hotel A, B, and C is 30%, 30%, and 40%, respectively. The loyalty metric number may also be calculated over other grouping criteria including on-site behavior such as amount of money spent at a first subset of venues as compared to a second subset of venues.

The subsets of venues may be defined over a number of grouping criteria. In an embodiment, venues may be grouped into loyalty determination subsets. Loyalty determination sets may be defined over any number of grouping criteria. For example, the guest monitoring system 110 may group venues with respect to hotel chains, or with respect to hotel brands, or with respect to analytically defined clusters of properties. In an embodiment, loyalty of a specific traveler t to a specific chain (or property) c, is defined as below:

$$LM_{t,c} = \frac{\sum_j v_{t,c}}{\sum v_t}$$

where $v_{t,c}$ is the number of visits to property c by a traveler t and $\Sigma v_t$ is the total number of visits by the same traveler to all properties in the loyalty determination set. Average booking days or average revenue may also be taken into account to calculate the loyalty metric number. In some embodiments, the metric averages are computed for all visits so that estimates of a traveler's value metric to the target property, brand, chain, cluster, etc. can be compared to the average value over all properties in the relevant loyalty determination set. The guest monitoring system 110 can provide the loyalty metric number to venue systems for a particular guest. Additionally, the guest monitoring system 110 can also push content based on the determined loyalty metric number.

Hotels (or other guest services) can use the loyalty metric to influence traveler choices in ways that loyalty programs alone may be unable to do because individual hotel chains might not possess data from other chains. In an embodiment, the guest monitoring system 110 can alert hotels to the presence of high value guests (e.g. road warriors) who stay with them infrequently. For example, the guest monitoring system 110 can identify all the high frequency travelers based on detecting their mobile computer's connection requests during their travel. When a particular high frequency traveler visits a hotel (e.g. Hotel A) as determined by a connection request, the guest monitoring system 110 can calculate the loyalty metric number for that traveler with respect to Hotel A. The connection request may be a request to connect to the network. In an embodiment, the connection request is automatically initiated between a mobile device of the traveler and a network management system as soon as the traveler is within the coverage area of the network management system. Accordingly, Hotel A may be able to identify a traveler as soon as he or she enters the premises and trigger one or more response systems. For instance, the guest monitoring system 110 can send an alert to a mobile device of the guest services manager at the hotel. In other embodiments, the system 110 can automatically place a request to the room services system to deliver a complimentary bottle of wine along with a voucher for use in the hotel restaurant. Thus, guest monitoring system 110 can enable hotels to target a segment of customers.

The guest monitoring system 110 can also generate reports of loyalty metrics for a particular chain to determine attrition and identify at risk customers. In an embodiment, the guest monitoring system 110 can determine a rate of change in the loyalty metric over time (e.g. 6 months) to identify possible defectors. The guest monitoring system 110 can also calculate future or predicted loyalty scores for a new traveler in the system based on determined patterns of the other travelers. Further, as described above, the guest monitoring system 110 can identify travel patterns including future destinations of visitors.

Segmentation

Clustering or segmenting travelers based on one or more stored attributes in the data store 118 may be useful in identifying certain patterns or behaviors of the travelers. The analytics module 114 of the guest monitoring system 110 can identify groups or clusters of travelers based on the stored data by using cluster analysis or other appropriate analytical methods. For example, the analytics module 114 can identify that a certain group of travelers prefer hotels with 3 or more conference rooms. If there are enough travelers in that group, then the analytics module 114 can create a cluster with 3 or more conference rooms. Accordingly, clusters can be based on property attribute preference. For example, the analytics module 114 can determine that there is a cluster of travelers based on one or more of the following attributes of the property: hotel age, room size, cost, location (e.g. suburban, rural, airport, downtown), brand, ballroom, conference rooms, etc. Each mathematical cluster can relate to a traveler segment. For example, business travelers may prefer hotels with at least a certain number of rooms. In certain embodiments, all the data is automatically collected by the guest monitoring system 110 through user devices as described above. For example, consider User Alice visiting Hotels $H_{A1}$, $H_{A2}$ . . . $H_{Am}$ and user Bob visiting Hotels $H_{B1}$, $H_{B2}$, . . . $H_{Bn}$. The GMS 110 can store this visit data in data repository 118 as discussed above. Further, the GMS 110 may also store a set of attributes for each of the hotels visited by Bob and Alice. The GMS 110 can store the visit data for hundreds of thousands of users and their corresponding visits to hotels. The GMS 110 can use the stored visit data to determine clusters and user preferences as described below.

Cluster analysis can find distinct groups based on mathematical clustering in an n-dimensional hyperspace. Taking cluster analysis as an example, a traveler may be assigned to a unique cluster or segment based on comparison of the traveler's attributes and the attributes of the cluster. It is possible that a traveler will not fit well into any segment. In this case the traveler may be treated as unclassifiable. In some embodiments, the analytics module 114 can generate 6 or less clusters. In other embodiments, the analytics module can generate 10 or less clusters. In yet other embodiments, the analytics module can generate more than 10 clusters.

An example cluster calculation is described below. Consider in one embodiment, data related to hotel attributes is stored in a data repository. In some embodiments, this data is stored while tracking travelers through identifiers on their guest devices 130 described herein. In an embodiment, the data can be arranged in a tabular format. The rows are individual hotels. The columns are attributes of the hotels. One attribute (e.g. Column B) might be the number of rooms in the hotel. Another (e.g. Column C) might be the number of restaurants. Column D might be how far it is from the nearest major airport. Column E might be the average daily rate. There could be hundreds of additional attributes related to a hotel, destination, or traveler. Assume 10,000 hotels in the spreadsheet (10,001 rows—the first row being the column headers). The guest monitoring system 110 can generate clusters based on the data. In an embodiment, the guest monitoring system 110 can generate 5 clusters. The clustering algorithm implemented in the guest monitoring system 100 can use the data to determine the best way to fit each row (hotel) into a cluster such that it has more in common with the other hotels in that cluster than it does with the hotels in the other 4 clusters. In making this determination, some of the attributes (properties) of the hotels may be more important than others.

Figure 10:
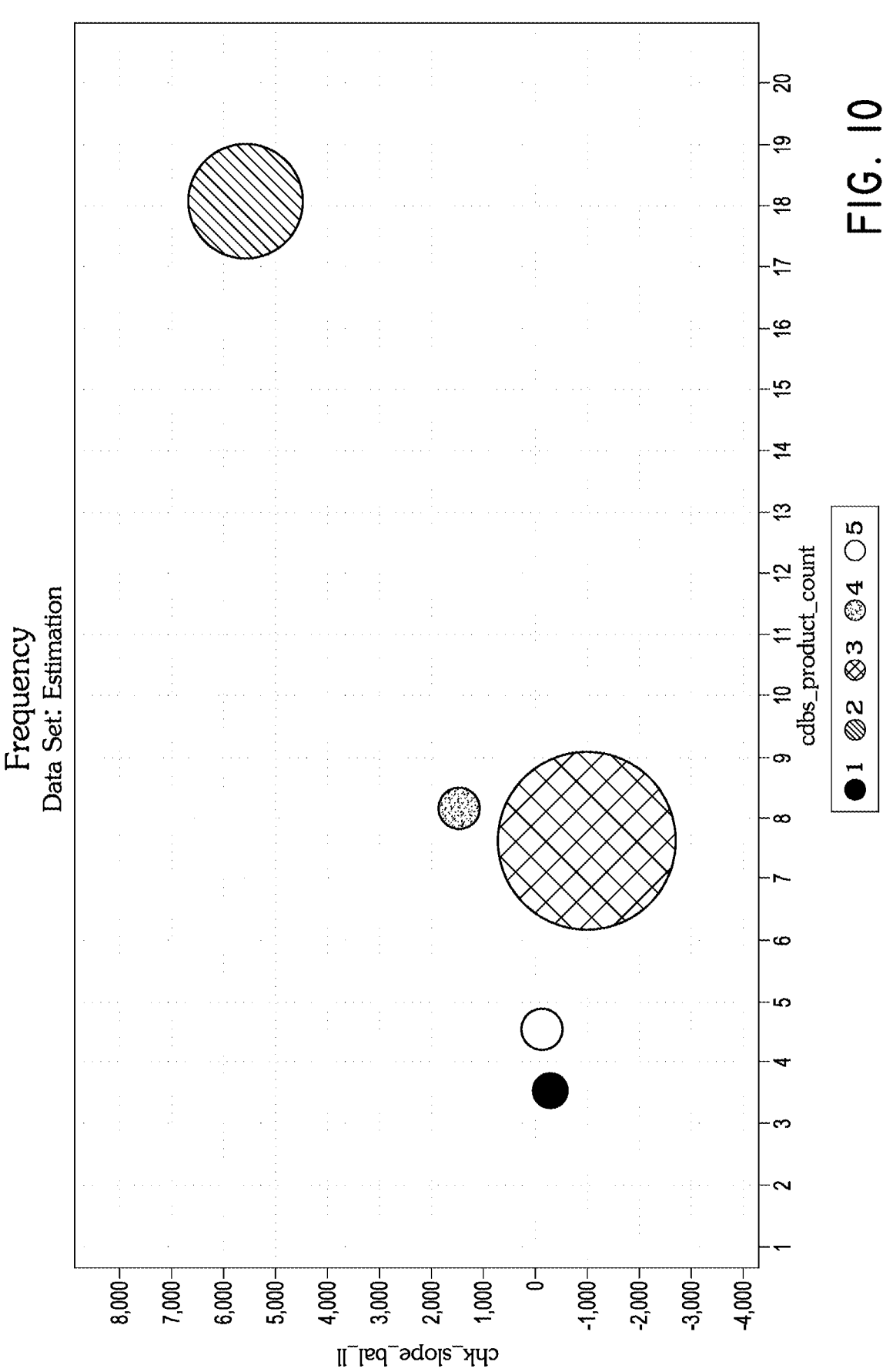
FIG. 10 shows an example cluster analysis using KXEN® unsupervised learning algorithms.

FIG. 10 shows an example cluster analysis using KXEN® unsupervised learning algorithms. Five distinct clusters were found, plotted against the two factors. The factors can be, for example, star classification and average daily rate.

In addition to identifying the clusters and assigning travelers to the identified clusters, the analytics module 114 can determine a probability that a particular traveler belongs in a particular segment. Accordingly, segment membership can be a probability function that defines the likelihood that a Traveler does in fact belong in a particular segment. Travelers can be assigned a membership probability score which may be expressed as a decimal fraction like "0.71". In this example, the score can indicate a 71% probability (confidence level/likelihood) that the traveler is a member of a particular segment. This score may be determined by an analytical model using a combination of segment number and all useful metrics in the data repository 118. The segment probabilities for travelers can also be stored in the data repository 118 after it is calculated by the analytics module 114 and updated in time. For a set of travelers, assuming 5 segments, the set of segment membership probabilities can be represented as follows:

$$P_{s,t} = f_s(\text{Attributes}_t)$$

where,

P$_{s,t}$ is the membership probability of Traveler t in Segment s

Attributes$_t$ includes the attributes of Traveler t contained in the data repository 118.

Figure 11:
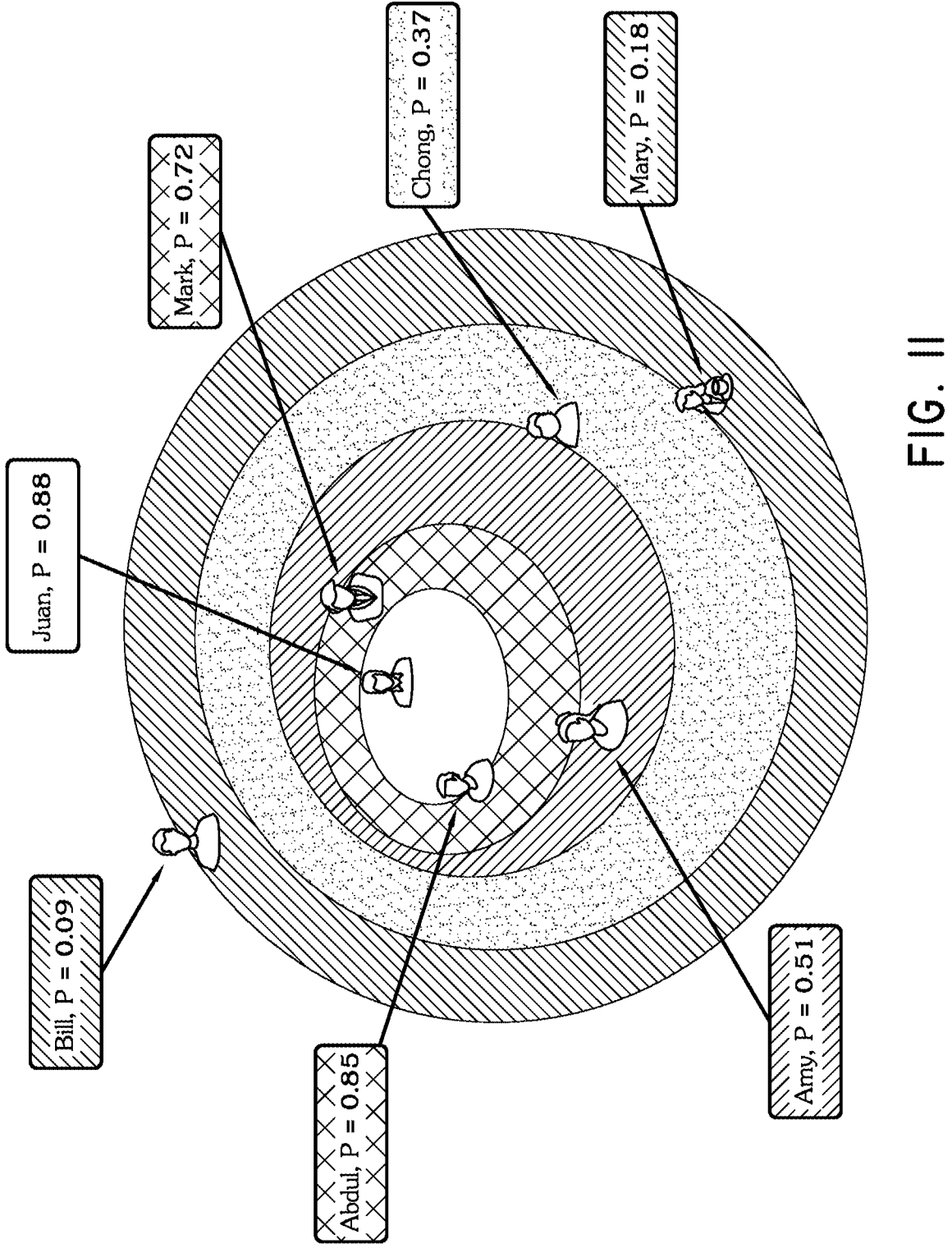
FIG. 11 shows segment probabilities for a group of travelers based on a cluster analysis.

P$_{s,t}$ can be scored by a segment probability model (neural network, logistic regression, decision tree, etc.) trained on all traveler data supervised by Segment. If there are five segments, each Traveler can be scored by each segment model. Segment membership scores can be added to the traveler data store 118. FIG. 11 shows segment probabilities for a group of travelers. For example, the probability of Amy in that segment is 0.51 or 51%.

The probability distributions can be used to generate marketing models. A marketing model, e.g., for visitation probability to a specific chain or site, may be trained on Visit data, profile data, and segment probability scores. The marketing model can be implemented by the analytics module 114. Clustering or segmentation can enable guest monitoring system 110 to correlate attributes of hotels with guests and focus on targeted marketing.

Figure 12:
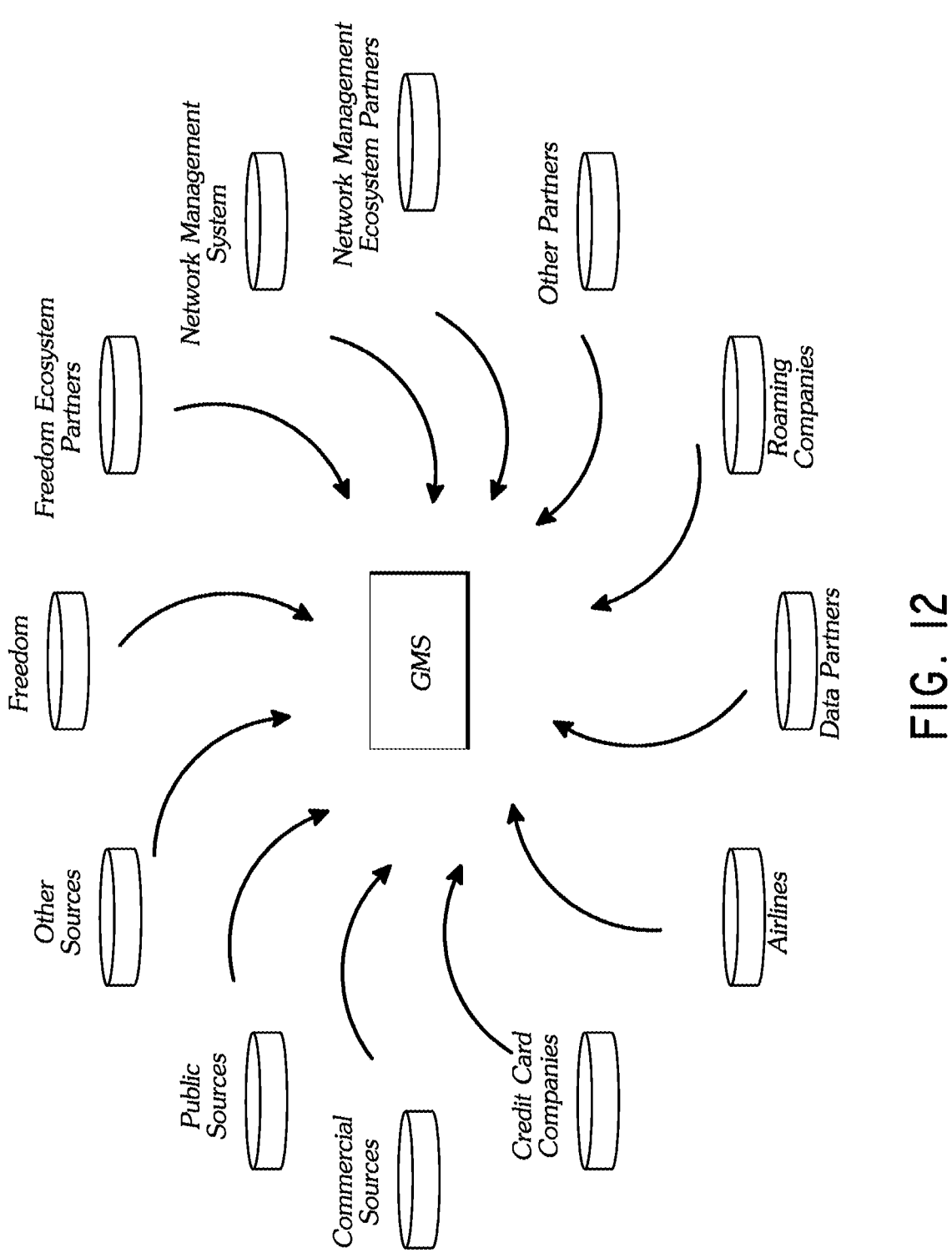
FIG. 12 illustrates an embodiment of guest monitoring system receiving data from a wide variety of sources.
Figure 13:
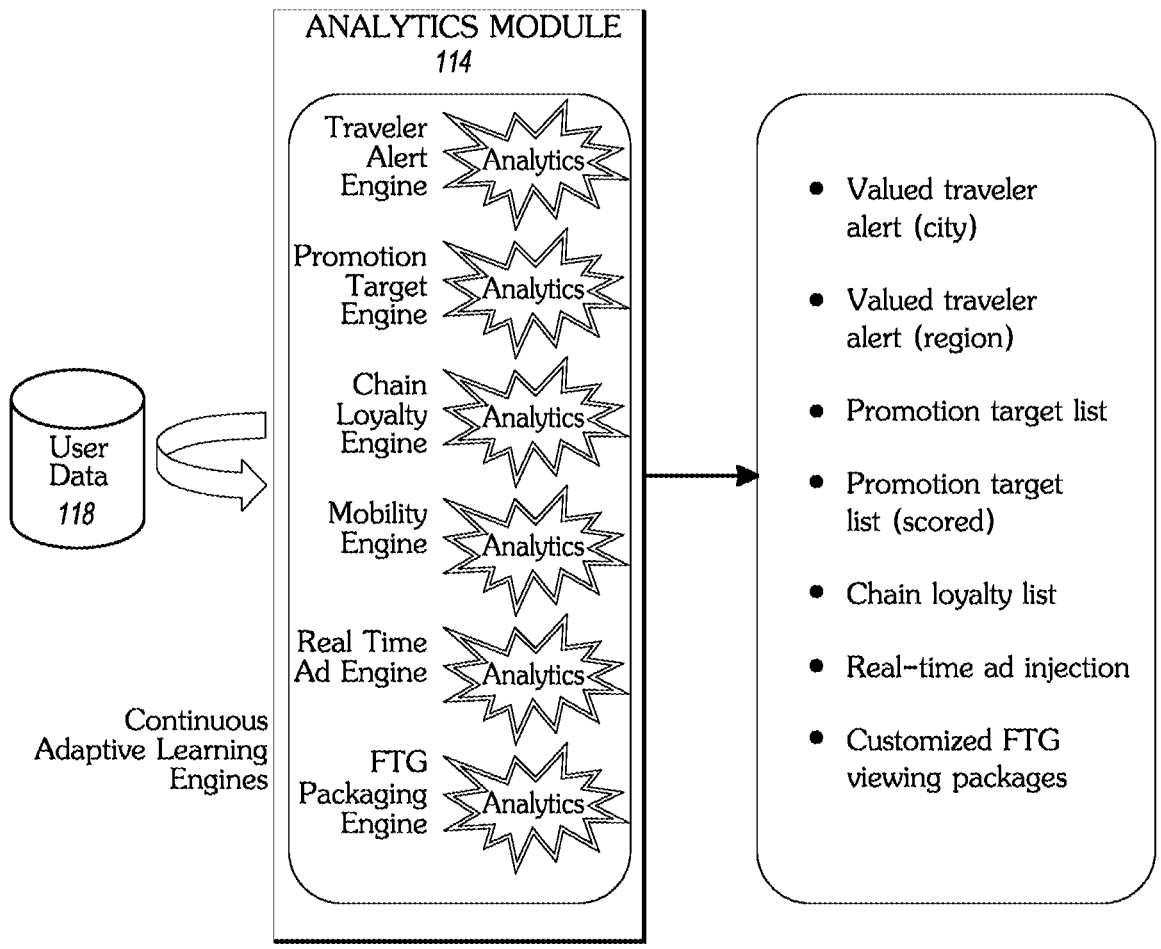
FIG. 13 illustrates an embodiment of the analytics module that includes multiple sub-modules.

FIG. 12 illustrates that the GMS may collect data from multiple in house or third party sources.

IV. Terminology

A number of computing systems have been described throughout this disclosure. The descriptions of these systems are not intended to limit the teachings or applicability of this disclosure. For example, the user systems and described herein can generally include any computing device(s), such as desktops, laptops, video game platforms, television set-top boxes, televisions (e.g., internet TVs), computerized appliances, and wireless mobile devices (e.g. smart phones, PDAs, tablets, or the like), to name a few. Further, it is possible for the user systems described herein to be different types of devices, to include different applications, or to otherwise be configured differently. In addition, the user systems described herein can include any type of operating system ("OS"). For example, the mobile computing systems described herein can implement an Android™ OS, a Windows® OS, a Mac® OS, a Linux or Unix-based OS, or the like.

Further, the processing of the various components of the illustrated systems can be distributed across multiple machines, networks, and other computing resources. In addition, two or more components of a system can be combined into fewer components. For example, the various systems illustrated can be distributed across multiple computing systems, or combined into a single computing system. Further, various components of the illustrated systems can be implemented in one or more virtual machines, rather than in dedicated computer hardware systems. Likewise, the data repositories shown can represent physical and/or logical data storage, including, for example, storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Depending on the embodiment, certain acts, events, or functions of any of the algorithms, methods, or processes described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially.

Each of the various illustrated systems may be implemented as a computing system that is programmed or configured to perform the various functions described herein. The computing system may include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium. The various functions disclosed herein may be embodied in such program instructions, although some or all of the disclosed functions may alternatively be implemented in application-specific circuitry (e.g., ASICs or FPGAs) of the computer system. Where the computing system includes multiple computing devices, these devices may, but need not, be co-located. The results of the disclosed methods and tasks may be persistently stored by transforming physical storage devices, such as solid state memory chips and/or magnetic disks, into a different state. Each process described may be implemented by one or more computing devices, such as one or more physical servers programmed with associated server code.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a" and "an" are to be construed to mean "one or more" or "at least one" unless specified otherwise.

While the above detailed description has shown, described, and pointed out novel features as applied to various embodiments, it will be understood that various omissions, substitutions, and changes in the form and details of the devices or algorithms illustrated can be made without departing from the spirit of the disclosure. Thus, nothing in the foregoing description is intended to imply that any particular feature, characteristic, step, module, or block is necessary or indispensable. As will be recognized, the processes described herein can be embodied within a form that does not provide all of the features and benefits set forth herein, as some features can be used or practiced separately from others. The scope of protection is defined by the appended claims rather than by the foregoing description.

What is claimed is:

1. A method, comprising:
detecting, by a guest monitoring system comprising a memory and one or more processors, a plurality of network connection requests to connect to network resources during visits at a plurality of venues from a user device associated with a first user, a first network connection request of the plurality of network connection requests comprising a request for internet access for the user device;
determining, by the one or more processors, based on the plurality of network connection requests, an identifier associated with the first user;
determining, by the one or more processors, user information associated with the first network connection request;

in response to the first network connection request, authorizing the first user for internet access based on the user information;
tracking, by the one or more processors, the visits based in part on the identifier, wherein the tracking comprises determining respective venue attributes corresponding to the plurality of venues visited by the first user, and storing the venue attributes in the memory in conjunction with the identifier;
conducting the detection and the tracking for a plurality of users visiting the plurality of venues;
determining, by the one or more processors, a plurality of clusters of users based on the tracked data;
determining, by the one or more processors, a score for a first venue of the plurality of venues for the first user based in part on said tracking and based further in part on the user information associated with the first network connection request, wherein the score indicates a level of the first user's visits to the first venue of the plurality of venues;
determining, by the one or more processors, a first likelihood of the first user belonging in a first cluster of the plurality of clusters of users; and
in accordance with said authorizing the first user for internet access, providing network content to the user based on the first user's score and based further on the first likelihood of the first user belonging to the first cluster.

2. The method of claim 1, wherein the identifier comprises a MAC address of the user device.

3. The method of claim 1, further comprising:
tracking, by the one or more processors, a plurality of requests by the first user, the plurality of requests comprising the request for internet access, said tracking comprising storing tracking data for the first user in the memory.

4. The method of claim 1, wherein the network content is generated based on the first user's score.

5. The method of claim 1, wherein the network content is generated based on the score for the first venue.

6. The method of claim 4, further comprising adjusting a traveler treatment of the first user based on the first user's score.

7. The method of claim 3, further comprising determining an out-of-pattern venue visit based at least in part on the tracking data.

8. A guest monitoring system, comprising:
a memory; and
one or more processors configured to execute computer-executable instructions that, when executed by the one or more processors, cause the one or more processors to perform a method comprising:
detecting, by a guest monitoring system comprising a memory and one or more processors, a plurality of network connection requests to connect to network resources during visits at a plurality of venues from a user device associated with a first user, a first network connection request of the plurality of network connection requests comprising a request for internet access for the user device;
determining, by the one or more processors, based on the plurality of network connection requests, an identifier associated with the first user;
determining, by the one or more processors, user information associated with the first network connection request;

in response to the first network connection request, authorizing the first user for internet access based on the user information;

tracking, by the one or more processors, the visits based in part on the identifier, wherein the tracking comprises determining respective venue attributes corresponding to the plurality of venues visited by the first user, and storing the venue attributes in the memory in conjunction with the identifier;

conducting the detection and the tracking for a plurality of users visiting the plurality of venues;

determining, by the one or more processors, a plurality of clusters of users based on the tracked data;

determining, by the one or more processors, a score for a first venue of the plurality of venues for the first user based in part on said tracking and based further in part on the user information associated with the first network connection request, wherein the score indicates a level of the first user's visits to the first venue of the plurality of venues;

determining, by the one or more processors, a first likelihood of the first user belonging in a first cluster of the plurality of clusters of users; and in accordance with said authorizing the first user for internet access, providing network content to the user based on the first user's score and based further on the first likelihood of the first user belonging to the first cluster.

9. The guest monitoring system of claim 8, wherein the identifier comprises a MAC address of the user device.

10. The guest monitoring system of claim 8, wherein the method further comprises:

tracking, by the one or more processors, a plurality of requests by the first user, the plurality of requests comprising the request for internet access, said tracking comprising storing tracking data for the first user in the memory.

11. The guest monitoring system of claim 8, wherein the network content is generated based on the first user's score.

12. The guest monitoring system of claim 8, wherein the network content is generated based on the score for the first venue.

13. The guest monitoring system of claim 8, wherein the method further comprises adjusting a traveler treatment of the first user based on the first user's score.

14. The guest monitoring system of claim 8, wherein the method further comprises determining an out-of-pattern venue visit based at least in part on the tracking data.

15. A non-transitory computer-readable medium storing instructions which, when executed by one or more processors of a guest monitoring system comprising a memory, cause the one or more processors to perform a method comprising:

detecting a request for internet access for a user device;

receiving a device hardware identifier associated with the user device;

determining, based on the request for internet access, an identifier associated with a first user;

determining, based on the association, user information associated with the first user;

authorizing the first user for internet access based on the user information and based further on a response to a query communicated by the guest monitoring system to an external computer server, the query based on the user information;

providing content via a computer network in response to authorizing the first user for internet access;

determining, via a network management portal in communication with the guest monitoring system and further in communication with a database, a first venue attribute of a first venue associated with the request for internet access, and storing the first venue attribute in the memory in conjunction with the identifier;

determining, via the network management portal, a second venue attribute of a second venue associated with a second request for internet access;

determining, based on the first venue attribute and based further on the second attribute, generated content; and in accordance with said authorizing the first user for internet access, providing network content to the user based on the first user's score and based further on the first likelihood of the first user belonging to the first cluster.

16. The non-transitory computer-readable medium of claim 15, wherein the identifier comprises a MAC address of the user device.

17. The non-transitory computer-readable medium of claim 15, wherein the method further comprises:

tracking, by the one or more processors, a plurality of requests by the first user, the plurality of requests comprising the request for internet access, said tracking comprising storing tracking data for the first user in the memory.

18. The non-transitory computer-readable medium of claim 15, wherein the network content is generated based on the first user's score.

19. The non-transitory computer-readable medium of claim 15, wherein the network content is generated based on the score for the first venue.

20. The non-transitory computer-readable medium of claim 15, wherein the method further comprises adjusting a traveler treatment of the first user based on the first user's score.

* * * * *